（12）United States Patent
Lee

(10) Patent No.: US 9,736,277 B2
(45) Date of Patent: Aug. 15, 2017

(54) PPDU FORMAT PREAMBLE DESIGN

(71) Applicant: NEWRACOM, INC., Irvine, CA (US)

(72) Inventor: Daewon Lee, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 14/756,911

(22) Filed: Oct. 28, 2015

(65) Prior Publication Data

US 2016/0119452 A1    Apr. 28, 2016

Related U.S. Application Data

(60) Provisional application No. 62/069,673, filed on Oct. 28, 2014.

(51) Int. Cl.
*H04W 4/00* (2009.01)
*H04L 29/06* (2006.01)

(52) U.S. Cl.
CPC ............. *H04L 69/22* (2013.01); *H04L 69/10* (2013.01)

(58) Field of Classification Search
None
See application file for complete search history.

(56) References Cited

U.S. PATENT DOCUMENTS

| | | | | |
|---|---|---|---|---|
| 2012/0320890 | A1* | 12/2012 | Zhang | H04L 1/004 370/338 |
| 2015/0302543 | A1* | 10/2015 | Weaver | H04L 9/00 382/100 |
| 2015/0381399 | A1* | 12/2015 | Taghavi Nasrabadi | H04L 5/0023 375/340 |
| 2016/0156750 | A1* | 6/2016 | Zhang | H04W 28/06 370/338 |

* cited by examiner

*Primary Examiner* — Phirin Sam
(74) *Attorney, Agent, or Firm* — McDermott Will & Emery LLP

(57) ABSTRACT

In an example of wireless communications, an access point may generate a frame and provide the frame for transmission to one or more stations. The frame may include a first signal field, a second signal field, and a data field. The first signal field may have a duration of 4 μs and may include a first signal portion and a first guard interval. The second signal field may have a duration of 4 μs and may include a second signal portion and a second guard interval. The data field may include at least one data symbol that has a symbol duration of 12.8 μs, excluding any guard interval duration. A station may detect the frame and process the frame. Other methods, apparatus, and computer-readable media are also disclosed.

13 Claims, 30 Drawing Sheets

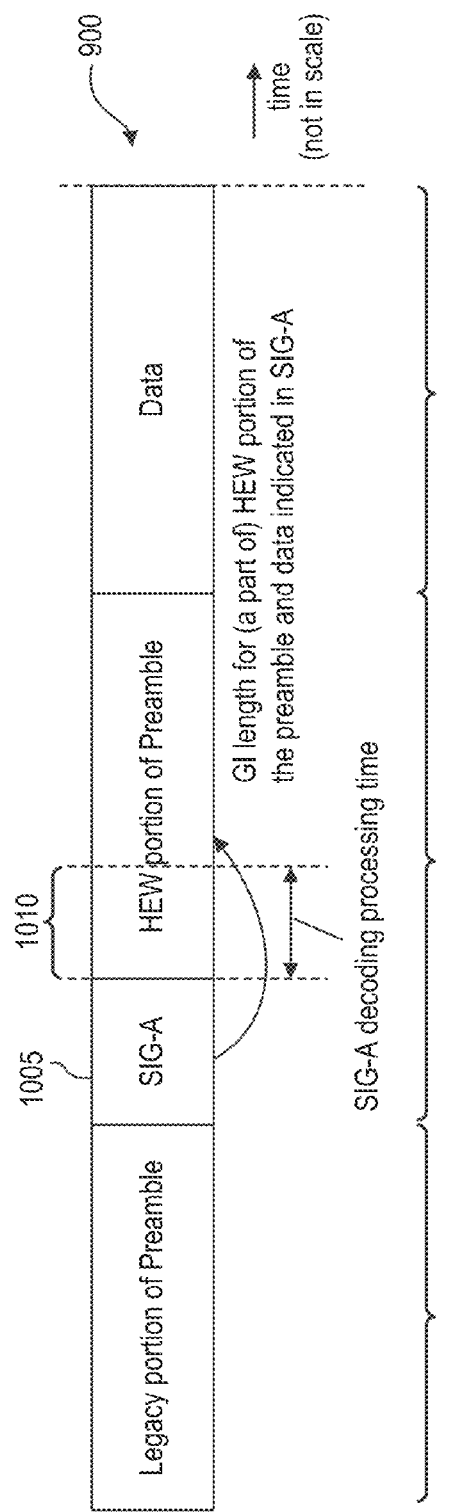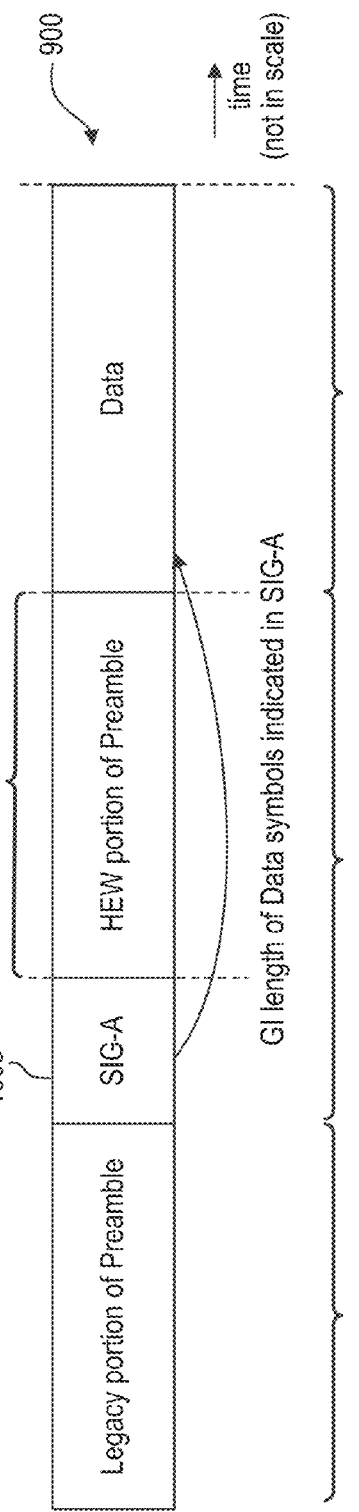

PPDU FORMAT PREAMBLE DESIGN

CROSS-REFERENCE TO RELATED APPLICATIONS

This application claims the benefit of priority from U.S. Provisional Application No. 62/069,673, entitled "PHYSICAL LAYER CONVERGENCE PROCEDURE (PLCP) PROTOCOL DATA UNIT (PPDU) FORMAT FOR SUPPORTING LARGER CHANNEL DISPERSION," filed Oct. 28, 2014, which is incorporated herein by reference in its entirety.

TECHNICAL FIELD

The present description relates in general to wireless communication systems and methods, and more particularly to, for example, without limitation, physical layer convergence procedure (PLCP) protocol data unit (PPDU) format preamble design.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 9, 10, and 11 illustrate examples of guard interval duration configuration for OFDM symbols in an HE frame.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

During the standardization activities of the Institute of Electrical and Electronics Engineers (IEEE) 802.11, Task Group ax, support for larger fast Fourier transform (FFT) sizes and/or even longer guard interval (EGI) durations may be provided. The longer GI durations, which may include a GI duration of 1.6 µs, may facilitate coping with larger channel dispersion compared with current IEEE 802.11 specifications, such as the IEEE 802.11a, b, g, n, and ac. IEEE 802.11ax based transmissions may be associated with and referred to as high efficiency (HE) based transmissions. HE-based WLAN may be referred to as HEW. IEEE 802.11ac based transmissions may be associated with and referred to as very high throughput (VHT) based transmissions. IEEE 802.11n based transmissions may be associated with and referred to as high throughput (HT) based transmissions. IEEE 802.11a, b, and g based transmissions may be collectively associated with and referred to legacy based transmissions or non-HT based transmissions. As used herein, HEW and HE are used interchangeably and refer to high efficiency.

In one or more implementations, physical layer convergence procedure (PLCP) protocol data unit (PPDU) format preamble designs are provided for HE-based transmission. Detection of such PPDU format preamble designs is also provided. The HE-based PPDU formats may include a longer guard interval duration (e.g., 1.6 µs) to facilitate transmission in environments associated with larger channel dispersion. The channel dispersion may be from the channel itself and/or from signal composition from multiple terminals sending signals with slightly different timing. The term channel dispersion may be used interchangeably with channel delay spread.

Figure 1:
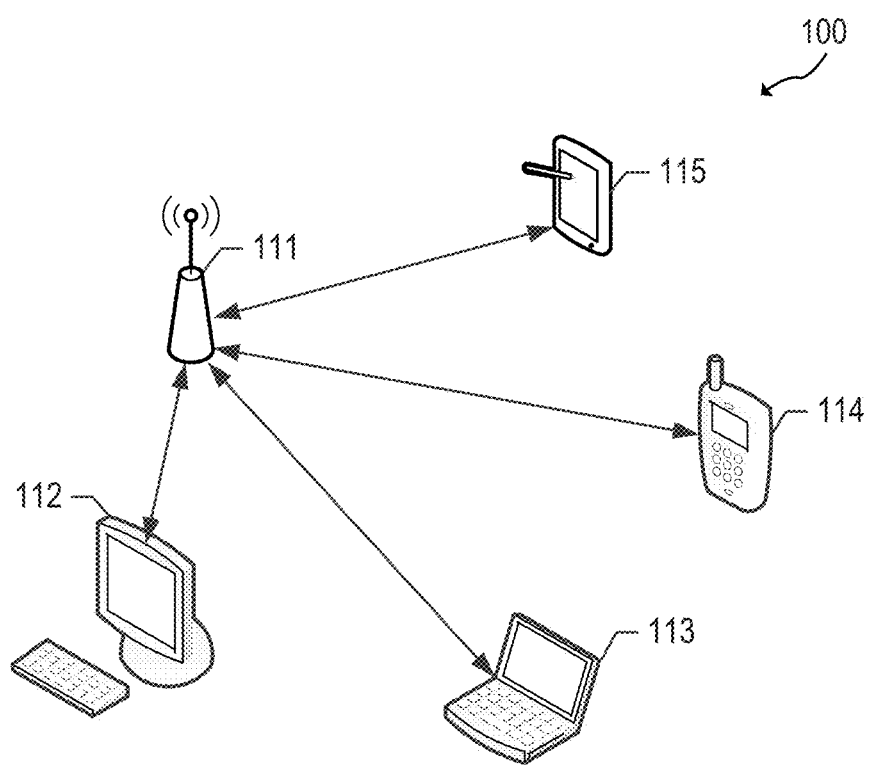
FIG. 1 illustrates a schematic diagram of an example of a wireless communication network.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, orthogonal frequency division multiple access (OFDMA)-based 802.11 technologies are utilized, and for the sake of brevity, a STA refers to a non-AP high efficiency (HE) STA, and an AP refers to an HE AP. In one or more aspects, a STA may act as an AP.

Figure 2:
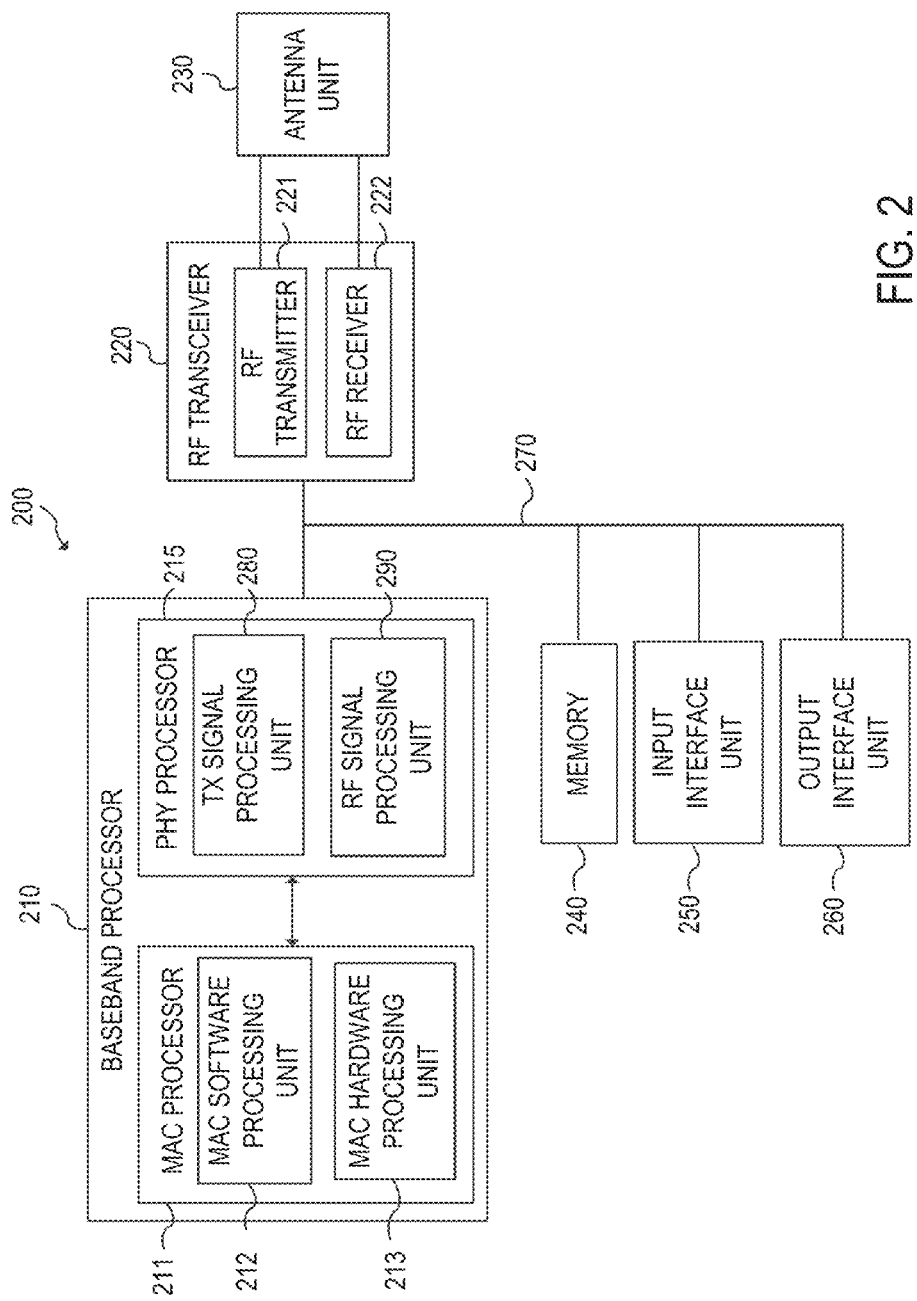
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3:
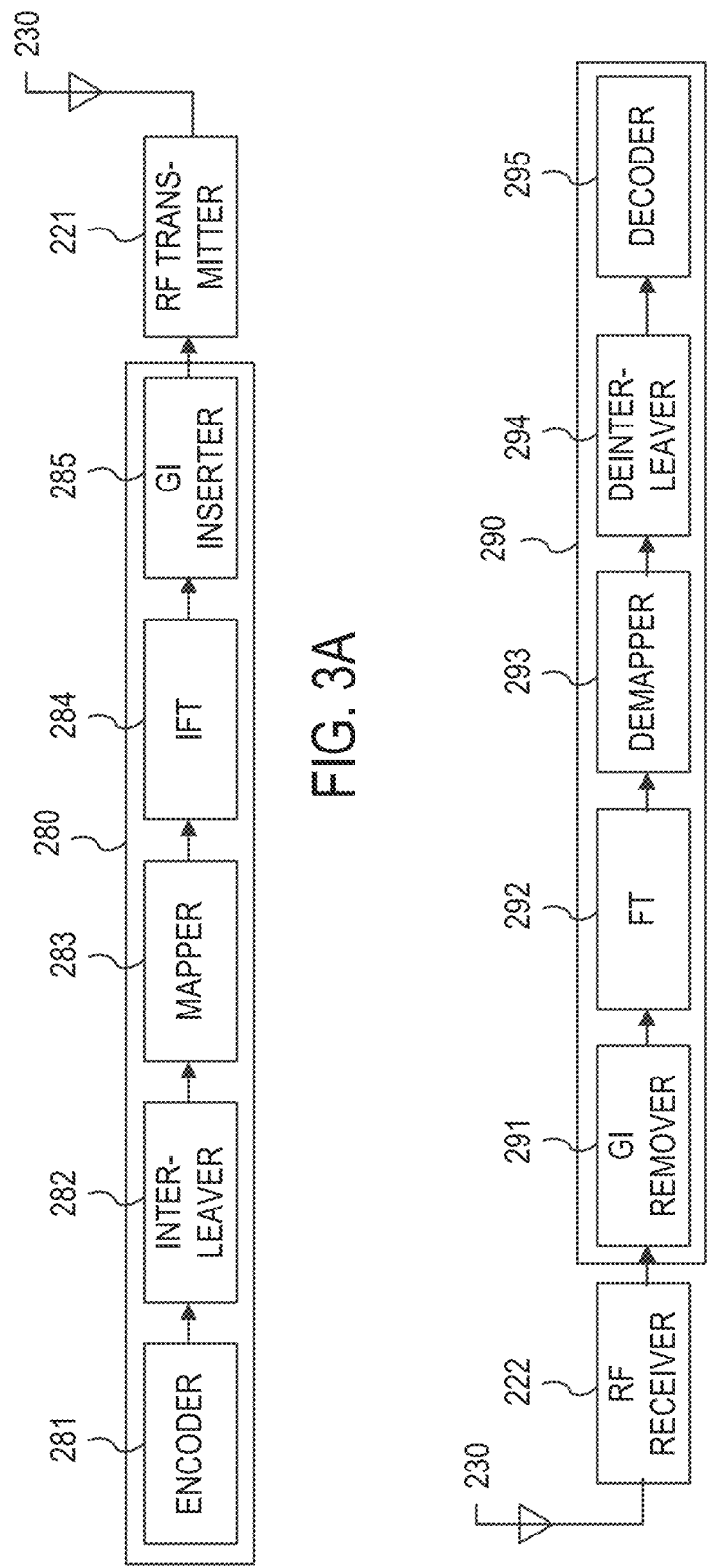
FIG. 3A illustrates a schematic block diagram of an example of a transmitting signal processor in a wireless communication device.
FIG. 3B illustrates a schematic block diagram of an example of a receiving signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
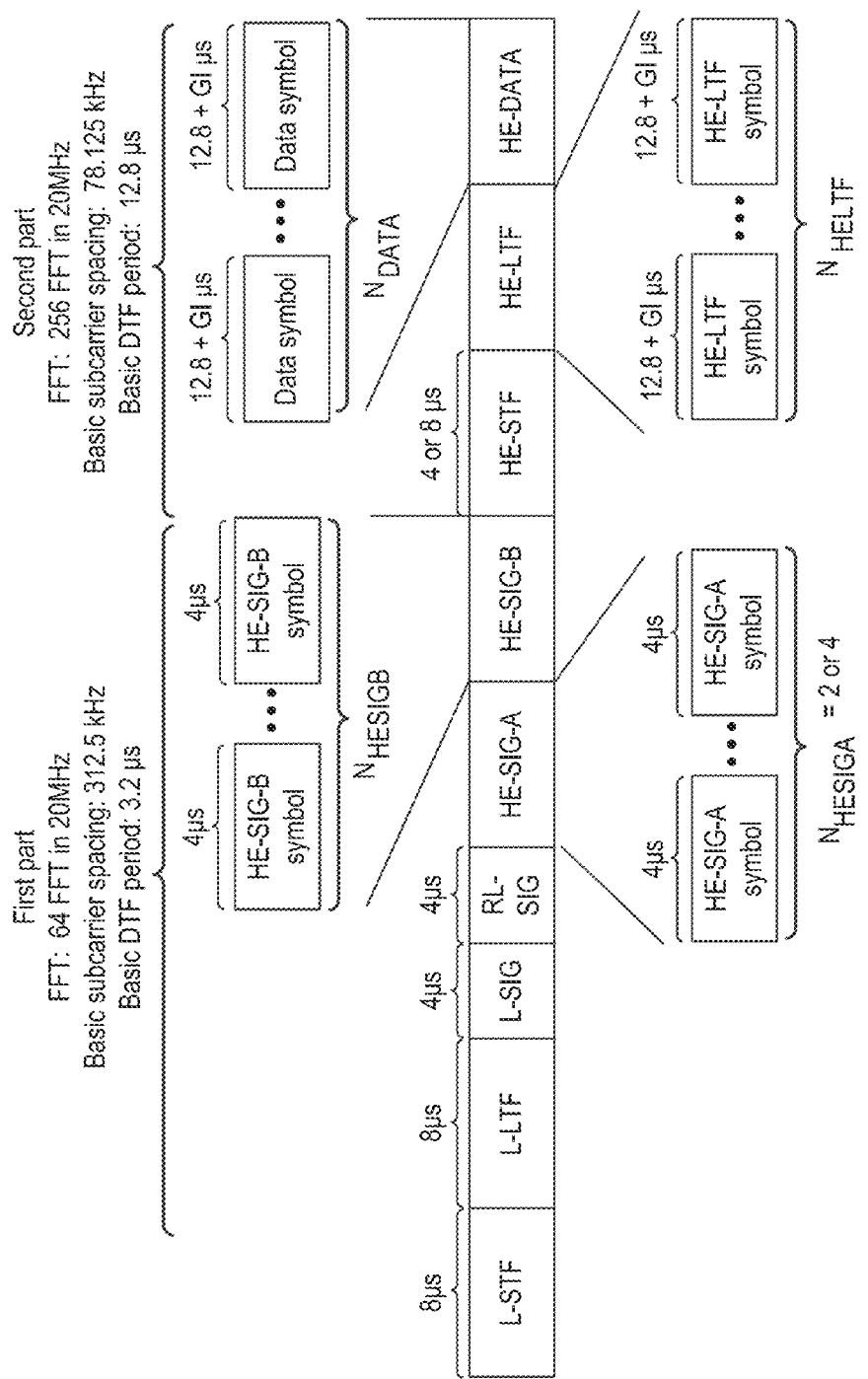
FIG. 4 illustrates an example of a high efficiency (HE) frame.

FIG. 4 illustrates an example of a high efficiency (HE) frame 400. The HE frame 400 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. In one or more implementations, an AP may transmit a frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header). As used herein, "us" and "µs" are used interchangeably and refer to a microsecond ($10^{-6}$ second).

Referring to FIG. 4, the HE frame 400 contains a header and a data field. The header includes a legacy header comprised of a legacy short training field (L-STF), a legacy long training field (L-LTF), and a legacy signal (L-SIG) field. These legacy fields contain symbols based on an early design of an IEEE 802.11 specification. The L-STF, L-LTF, and L-SIG fields may be 8 µs, 8 µs, and 4 µs, respectively. Presence of these symbols would make any new design compatible with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz. Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. Thus, in one aspect, the L-STF field is not affected by the channel dispersion. The L-LTF field may be utilized for channel estimation, fine frequency-offset correction, and symbol timing. The L-SIG field includes one orthogonal frequency division multiplexing (OFDM) symbol. Thus, in one aspect, the term L-SIG field may be used interchangeably with L-SIG symbol. In one or more aspects, the L-SIG field may contain information indicative of a data rate and a length (e.g., in bytes) associated with the HE frame 400, which may be utilized by a receiver of the HE frame 400 to calculate a time duration of a transmission of the HE frame 400.

The header may also include an HE header comprised of an HE-SIG-A field and an HE-SIG-B field. The HE-SIG-A field may sometimes be referred to simply as a SIG-A field. These fields contain symbols that carry control information that may be vital regarding each PLCP service data unit (PSDU) and regarding the radio frequency (RF), PHY, and MAC properties of a PPDU. Several sub-fields may be located either in the HE-SIG-A and/or HE-SIG-B fields. In one aspect, the HE-SIG-A field can be carried/modulated using an FFT size of 64. The HE-SIG-B field can be carried/modulated using an FFT size of e.g., 64 or 256 depending on implementation. The HE-SIG-A and HE-SIG-B fields may occupy the entire channel bandwidth of the frame. In some aspects, the size of the HE-SIG-A field and/or the HE-SIG-B field is variable. In other words, the number of symbols contained in the HE-SIG-A field and/or HE-SIG-B field can vary from frame to frame. For example, the number of symbols in the HE-SIG-A field (represented as $N_{HESIGA}$) may be two symbols, four symbols, among other possibilities. The number of symbols in the HE-SIG-B field (represented as $N_{HESIGB}$) may be one symbol, two symbols, zero symbols, among other possibilities. In this regard, an HE-SIG-B field is not always present in all frames. In some cases, single user (SU) packets and UL trigger-based packets do not contain the HE-SIG-B field. To facilitate decoding of the HE frame 400 by a receiver, the size of (e.g., number of symbols contained in) the HE-SIG-B field may be indicated in the HE-SIG-A field. Each of $N_{HESIGA}$ and $N_{HESIGB}$ symbols may be 4 µs including a guard interval (e.g., 0.8 µs guard interval).

For a 20 MHz channel, an FFT size of 64 is associated with a discrete Fourier transform (DFT) period of 3.2 µs and a subcarrier spacing of 312.5 kHz. For a 20 MHz channel, an FFT size of 256 is associated with a DFT period of 12.8 µs and a subcarrier spacing of 78.125 kHz. The DFT period may also be referred to as an inverse DFT period (IDFT) or an IDFT/DFT period. The DFT period may be denoted as $T_{DFT}$. The subcarrier spacing may be referred to as a subcarrier frequency spacing and may be denoted as $\Delta_F$. The DFT period may be obtained by dividing the channel bandwidth by the FFT size. The subcarrier spacing is the reciprocal of the DFT period.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 and modulated over the entire bandwidth of the frame. Thus, the HE-LTF field may occupy the entire channel bandwidth of the frame. The HE-STF symbols may have a fixed pattern and a fixed duration. For example, the HE-STF symbols may have a predetermined repeating pattern. In one aspect, the HE-STF symbols do not require FFT processing. The HE frame 400 may include the data field, represented as HE-DATA, that contains data symbols. The data field may also be referred to as a payload field, data, or payload.

A first part of the HE frame 400 may include the legacy STF, LTF and SIG symbols and the HE-SIG-A and HE-SIG-B symbols. A second part of the HE frame 400 may include HE-STF, HE-LTF, and HE-DATA symbols. In one example, a first part of the HE frame 400 may include those symbols that are modulated/carried with an FFT size of 64 on a 20 MHz channel (e.g., using a DFT period of 3.2 µs and a subcarrier spacing of 312.5 kHz), whereas a second part of the HE frame 400 may include those symbols that are modulated/carried with an FFT size of 256 on a 20 MHz channel (e.g., using a DFT period of 12.8 µs and a subcarrier spacing of 78.125 kHz). The L-STF and HE-STF symbols may be known predetermined patterns that do not require FFT processing. Thus, although depicted as being a component of the first part or the second part of the HE frame 400, the L-STF and HE-STF symbols may be considered separate from the first part and the second part of the HE frame 400.

In one or more aspects, the first part of the HE frame 400 is associated with a first FFT size, and the second part 422 of the HE frame 400 is associated with a second FFT size that is greater (or larger) than the first FFT size. In one or more aspects, the first part of the HE frame 400 is associated with a first subcarrier spacing (e.g., 312.5 kHz), and the second part of the HE frame 400 is associated with a second subcarrier spacing (e.g., 78.125 kHz) that is less than the first subcarrier spacing. In one aspect, a subcarrier spacing is a spacing between tones (or between subcarriers). In one or more aspects, the boundary of a first part and a second part of an HE frame 400 can be placed at a location other than the location shown in FIG. 4. For example, the first part may start at the beginning of the L-LTF field and end at the end of the HE-SIG-B field (or HE-SIG-A field when there is no HE-SIG-B field). The second part may start at the beginning of the HE-LTF field.

In one or more aspects, additional one or more of the HE-STF and/or HE-LTF fields may be included in the header. For example, an additional HE-STF field and/or an additional HE-LTF field may be included between the HE-SIG-A field and the HE-SIG-B field. The additional HE-STF and HE-LTF fields may be, for example, modulated/carried with FFT size of 64 on a 20 MHz channel and may be included as part of the first part of the HE frame 400. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Each of the fields (e.g., L-LTF, HE-SIG-B, etc.) of the HE frame 400 includes one or more guard intervals and one or more OFDM symbols. The guard interval may be utilized to facilitate compensation of multi-path effects, which may cause inter-symbol interference (ISI). In one or more implementations, a guard interval is a cyclic prefix (CP), and a guard interval duration is a CP length. In one or more aspects, the term duration may be referred to as a length. A guard interval associated with the first part of the HE frame may be predetermined to be, and set to, for example, 0.8 µs. In one aspect, a guard interval for each of a legacy OFDM symbol in the legacy header in the first part is set to, for example, 0.8 µs. In one aspect, no guard interval is used for symbols in the L-STF field. Each guard interval may be associated with a symbol and may be present between symbols (or between consecutive symbols). In some aspects, each OFDM symbol is preceded (or followed) by a guard interval. In some aspects, the OFDM symbol may be referred to as including the guard interval that precedes (or follows) the OFDM symbol.

In one aspect, multiple guard intervals may be represented as one long guard interval, and such long guard interval may precede (or follow) the OFDM symbols associated with the multiple guard intervals. For example, a guard interval of 1.6 µs (representing two guard intervals, each being 0.8 µs) may be prepended to two consecutive OFDM symbols associated with the two guard intervals.

In one or more implementations of a transmitter, a GI inserter 285 illustrated in FIG. 3A may prepend a guard interval to an OFDM symbol. For a receiver, a GI remover 291 of FIG. 3B may remove the prepended guard interval.

In one aspect, the term "OFDM symbol duration" or "symbol duration" may refer to a duration of the OFDM symbol itself, excluding any guard interval duration associated with the OFDM symbol. In another aspect, the term "OFDM symbol duration" or "symbol duration" may refer to the sum of a duration of an OFDM symbol and a duration of a guard interval associated with the OFDM symbol, rather than simply the duration of the OFDM symbol itself, e.g., without the duration of the guard interval.

The table below provides examples of characteristics associated with the various components of the HE frame 400.

sion compared to what is possible in current IEEE 802.11 specifications (e.g., IEEE 802.11a, b, g, n, ac).

Figure 5A:
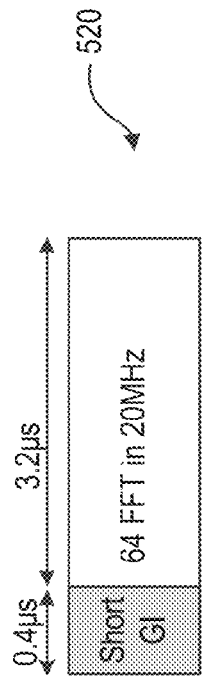
FIGS. 5A, 5B, and 5C illustrate various examples of orthogonal frequency division multiplexing (OFDM) symbols, each with a respective guard interval.
Figure 5B:
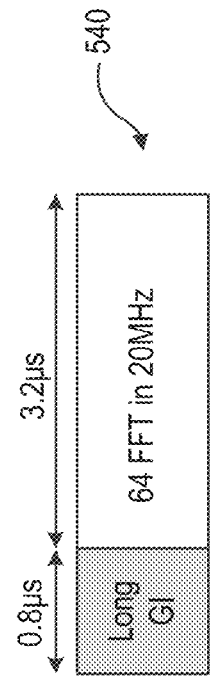
Figure 5C:
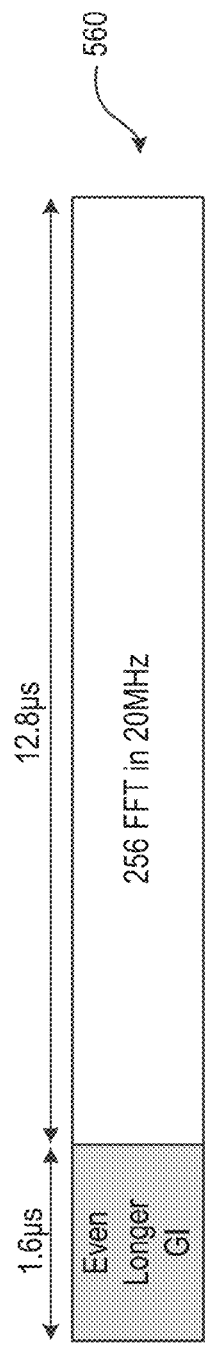

FIGS. 5A, 5B, and 5C illustrate various examples of OFDM symbols 520, 540, and 560, each including a respective guard interval (GI). FIG. 5A illustrates OFDM symbol

| Element | Definition | Duration | DFT period | GI | Subcarrier spacing | Description |
|---|---|---|---|---|---|---|
| L-STF | Non-HT Short Training field | 8 μs | — | — | equivalent to 1,250 kHz | HE-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz after the legacy preamble to indicate common control information. $N_{HESIGA}$ means the number of OFDM symbols of HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: equivalent to 1,250 kHz; trigger-based PPDU: equivalent to 625 kHz | HE-STF of a non-trigger-based PPDU has a periodicity of 0.8 μs with 5 periods. (A non-trigger-based PPDU is not sent in response to a trigger frame) The HE-STF of a trigger-based PPDU has a periodicity of 1.6 μs with 5 periods. (A trigger-based PPDU is an UL PPDU sent in response to a trigger frame) |
| HE-LTF | HE Long Training field | $N_{HELTF}$ * (DTF period + GI) μs | 2xLTF: 6.4 μs 4xLTF: 12.8 μs | supports 0.8, 1.6, 3.2 μs | 2xLTF: equivalent to 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

In one or more implementations, HE-based transmission may support larger FFT sizes and longer GI durations, such as a GI duration of 1.6 μs. As shown, for example, in FIG. 4 and the table above, different symbols of the HE frame may include different GI durations, including longer GI durations such as 1.6 μs. Utilization of longer GI durations, such as the even longer GI (EGI) of 1.6 μs, may allow the HE-based transmission to cope with larger channel disper-

520 that includes a data portion of 3.2 μs and a GI of duration 0.4 μs. The GI duration of 0.4 μs may be referred to as a short GI duration. The data portion of the OFDM symbol 520 may be modulated/carried with an FFT size of 64 on a 20 MHz channel. FIG. 5B illustrates OFDM symbol 540 that includes a data portion of 3.2 μs and a GI of duration 0.8 μs. The GI duration of 0.8 μs may be referred to as a long GI duration. The data portion of the OFDM symbol 540 may be modulated/carried with an FFT size of 64 on a 20 MHz channel. FIG. 5C illustrates OFDM symbol 560 that includes a data portion of 12.8 μs and a GI of duration 1.6 μs. The GI duration of 1.6 μs may be referred to as an even longer GI (EGI) duration or a double GI (D-GI or DGI) duration. The data portion of the OFDM symbol 560 may be modulated/carried with an FFT size of 256 on a 20 MHz channel. The OFDM symbol 560 may be utilized in HE-based transmissions. In one or more implementations, the guard interval is a cyclic prefix (CP), and a guard interval duration is a CP length.

Figure 6:
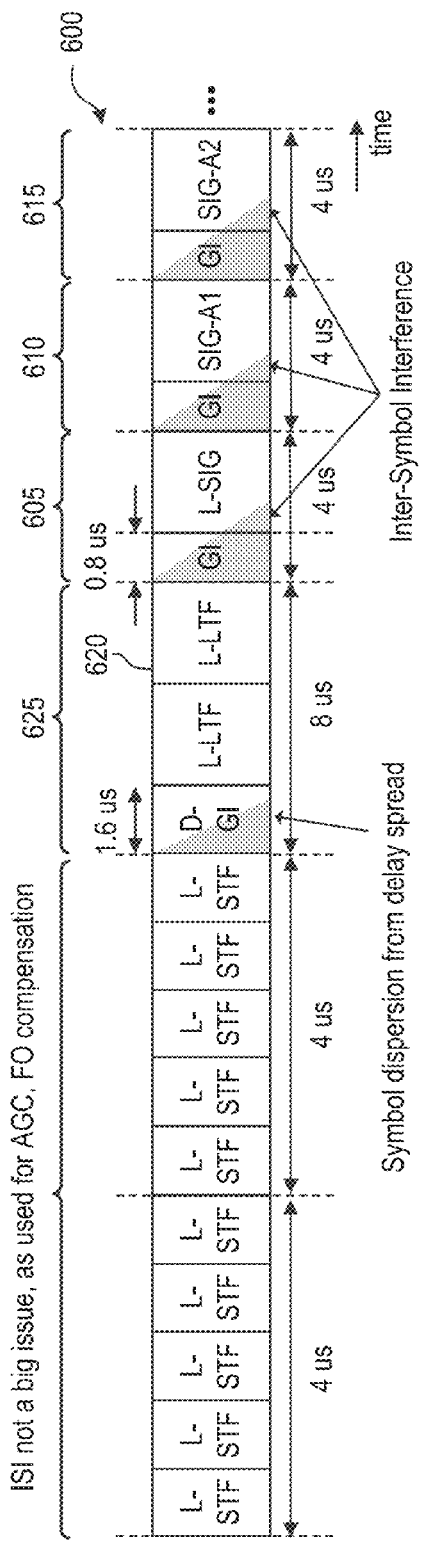
FIG. 6 illustrates an effect of a large channel delay spread in a preamble associated with an existing PPDU format.

FIG. 6 illustrates an effect of a large channel delay spread in a preamble 600 associated with an existing PPDU format, such as a high through (HT) PPDU format for IEEE 802.11n or a very high throughput (VHT) PPDU format for IEEE 802.11ac. In deployment environments that contain larger channel delay spread, such as outdoor environments, detection of various fields contained in the HT PPDU format and/or the VHT PPDU format, such as the L-SIG field 605, SIG-A1 field 610, and SIG-A2 field 615, may be difficult. In FIG. 6, the L-SIG field 605, SIG-A1 field 610, and SIG-A2 field 615 each include a respective GI of duration 0.8 μs. The larger channel spread may cause inter-symbol interference (ISI). The channel delay spread may be from the channel itself and/or from signal composition from multiple terminals sending signals with slightly different timing. The ISI may cause distortion in the L-SIG field 605, SIG-A1 field 610, and SIG-A2 field 615 (e.g., symbols contained in such fields) in a manner that makes it difficult, if not impossible, to be combated by simple receiver equalization algorithms. The ISI may be created by the channel spread, where a signal from a previous OFDM symbol is leaked into a next OFDM symbol. For example, a symbol 620 of an L-LTF field 625 may leak into a data portion of the L-SIG field 605. In some cases, signal detection of the L-LTF field 625 and channel estimation from the L-LTF field 625 may be performed even with larger channel delay spread as the L-LTF field 625 includes a longer GI duration of 1.6 μs.

In one or more implementations, a preamble for WLAN is designed to allow efficient support of communication in various environments, including environments with large channel delay spread. The preamble may be utilized for HE-based transmission. The channel delay spread may be from the channel itself and/or from signal composition from multiple terminals sending signals with slightly different timing.

In one or more implementations, in order to facilitate coping with larger channel delay spread, a larger GI duration is utilized for control signal OFDM symbols of an HE-SIG-A field. The control signal OFDM symbols may be referred to as HE-SIG-A symbols. The HE-SIG-A field may be, may include, or may be a part of, the HE-SIG-A field shown in FIG. 4. The HE-SIG-A field may be referred to as a New SIG-A field. The larger GI may be an EGI. Channel estimation from the L-LTF field may be used to equalize and decode the HE-SIG-A symbols.

Figure 7:
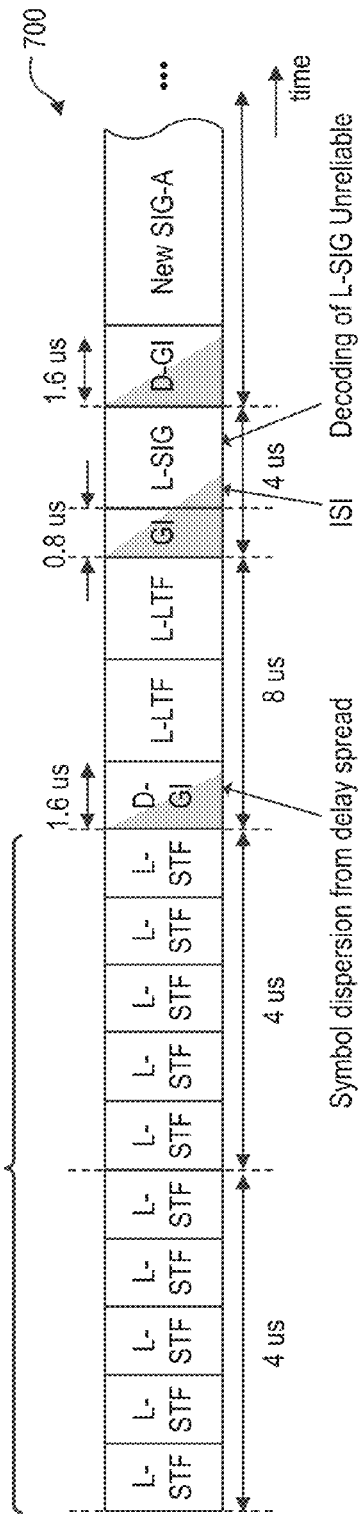
FIG. 7 illustrates an example of a portion of a PPDU format for WLAN systems.
Figure 8:
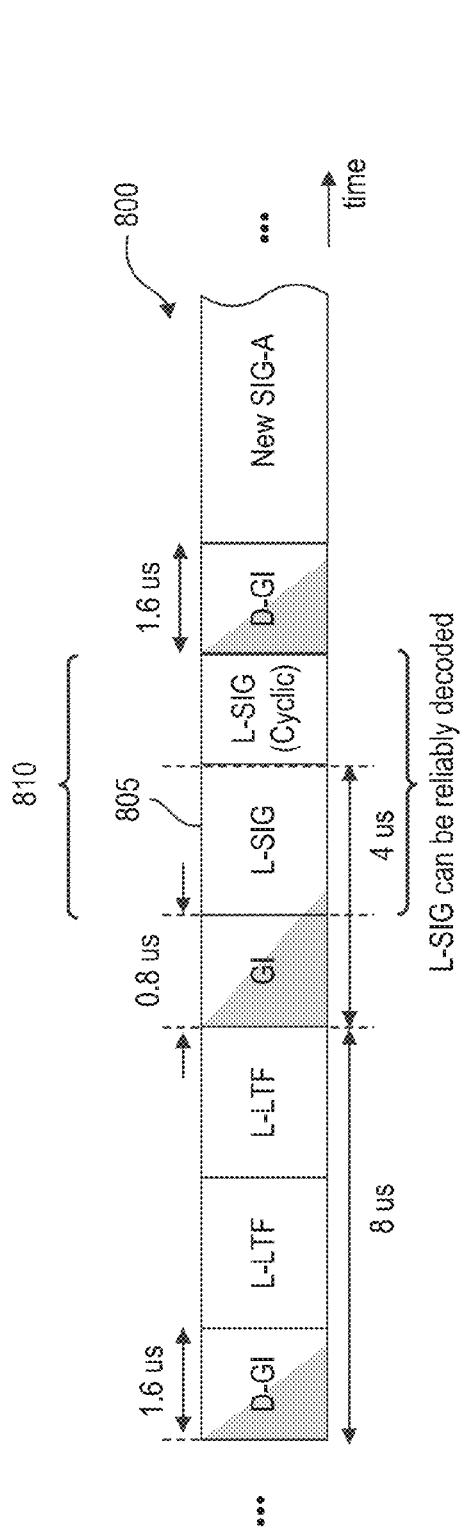
FIG. 8 illustrates an example of a portion of a PPDU format for WLAN systems.

FIGS. 7 and 8 illustrate examples of portions of two PPDU formats for WLAN systems. The PPDU formats may facilitate communication in larger channel delay spread. In FIG. 7, symbols with an EGI are utilized after the L-SIG in the preamble. In FIG. 8, the L-SIG 805 may be cyclically extended to form an extended L-SIG 810. The extended L-SIG 810 may allow receivers to utilize its extra-long symbol duration to overcome ISI. After the extended L-SIG symbol 810, subsequent symbols such as those in the New SIG-A field may utilize the EGI.

The PPDU formats associated with FIGS. 7 and 8 include preamble symbols such as the short training field (STF) symbols to aid automatic gain control (AGC), long training field (LTF) symbols to perform channel estimation and aid equalization of data symbols in the data field, and other control signal symbols. The control signal symbols may include SIG-A symbol(s), possibly SIG-B symbol(s) following the SIG-A symbol(s), and possibly SIG-C symbol(s) following the SIG-B symbol(s). Some of these preamble symbols may or may not utilize EGI.

Figure 9:
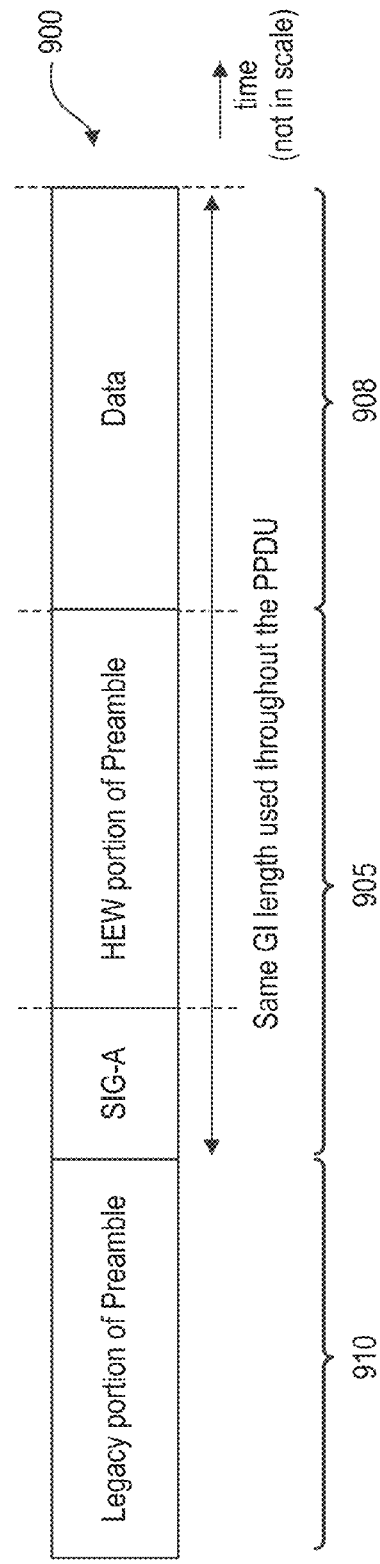

FIGS. 9, 10, and 11 illustrate examples of GI duration configuration for OFDM symbols in an HE frame 900. The HE frame 900 of FIGS. 9, 10, and 11 may be, may include, or may be a part of, the HE frame shown in FIG. 4. The HE frame 900 includes legacy preamble symbols 910, such as the L-STF, L-LTF, and L-SIG symbols. The L-SIG symbol may include an extension (e.g., a cyclic extension). The HE frame 900 also includes HE preamble symbols 905 and HE data symbols 908 in the HE data field. The HE preamble symbols 905 may include symbols in an HE-SIG-A, HE-STF, HE-LTF, and/or HE-SIG-B fields. For example, the HE-SIG-A field may consist of one or more OFDM symbols.

In FIG. 9, the OFDM symbols 905 and 908 may include a same predetermined GI duration throughout the HE frame 900. In one or more implementations, the predetermined GI duration may be the EGI. In one aspect, the GI length utilized in the HE frame 900 is not indicated in any part of the HE frame 900, but rather is detected by a receiver. For example, the receiver may utilize PPDU format detection to detect the GI length. Thus, the use of the EGI throughout the entire PPDU format of the HE frame 900 excluding the preamble symbols 910 requires that the PPDU format using EGI and the PPDU format not using EGI be differentiated and detected by the receiver.

In FIGS. 10 and 11, an indication of the GI duration included in at least a portion of the HE preamble symbols 905 and the HE data symbols 908 can be signaled in a control signal portion of the HE preamble of the PPDU, such as in an HE-SIG-A field 1005. The signaling of the GI duration may allow the OFDM symbols that follow the control signal portion containing the indication to be configured with a different GI duration compared with the GI duration of the SIG-A symbol(s).

In FIG. 10, the data symbols 908 and a portion of the preamble symbols 905 following a portion 1010 may be configured with the GI duration(s) provided in the indication. In some cases, the indication includes one GI duration (e.g., the EGI) to be included in each symbol of the data symbols 908 and the portion of the preamble symbols 905. The portion 1010, which include OFDM symbols immediately following the HE-SIG-A field 1005, may be within an HE-SIG-A decoding processing time of the receiver. The receiver may not have enough time to decode the HE-SIG-A field 1005 to obtain any GI information before reception of OFDM symbols within the portion 1010. In this regard, the OFDM symbols within the portion 1010 may be configured with a predetermined (e.g., fixed) GI. The predetermined GI may be the EGI. The OFDM symbols within the portion 1010 may utilize the GI duration included in OFDM symbols of the HE-SIG-A field 1005. In FIG. 11, the HE data symbols 908 may be configured with the GI duration(s) provided in the indication. In some cases, the indication includes one GI duration (e.g., the EGI) to be included in each symbol of the data symbols 908. The HE preamble symbols 905 may be configured with a predetermined GI, such as the EGI. OFDM symbols in a portion 1105 of the HE preamble symbols 905 may utilize the GI duration included in OFDM symbols of the HE-SIG-A field 1005.

Figure 12:
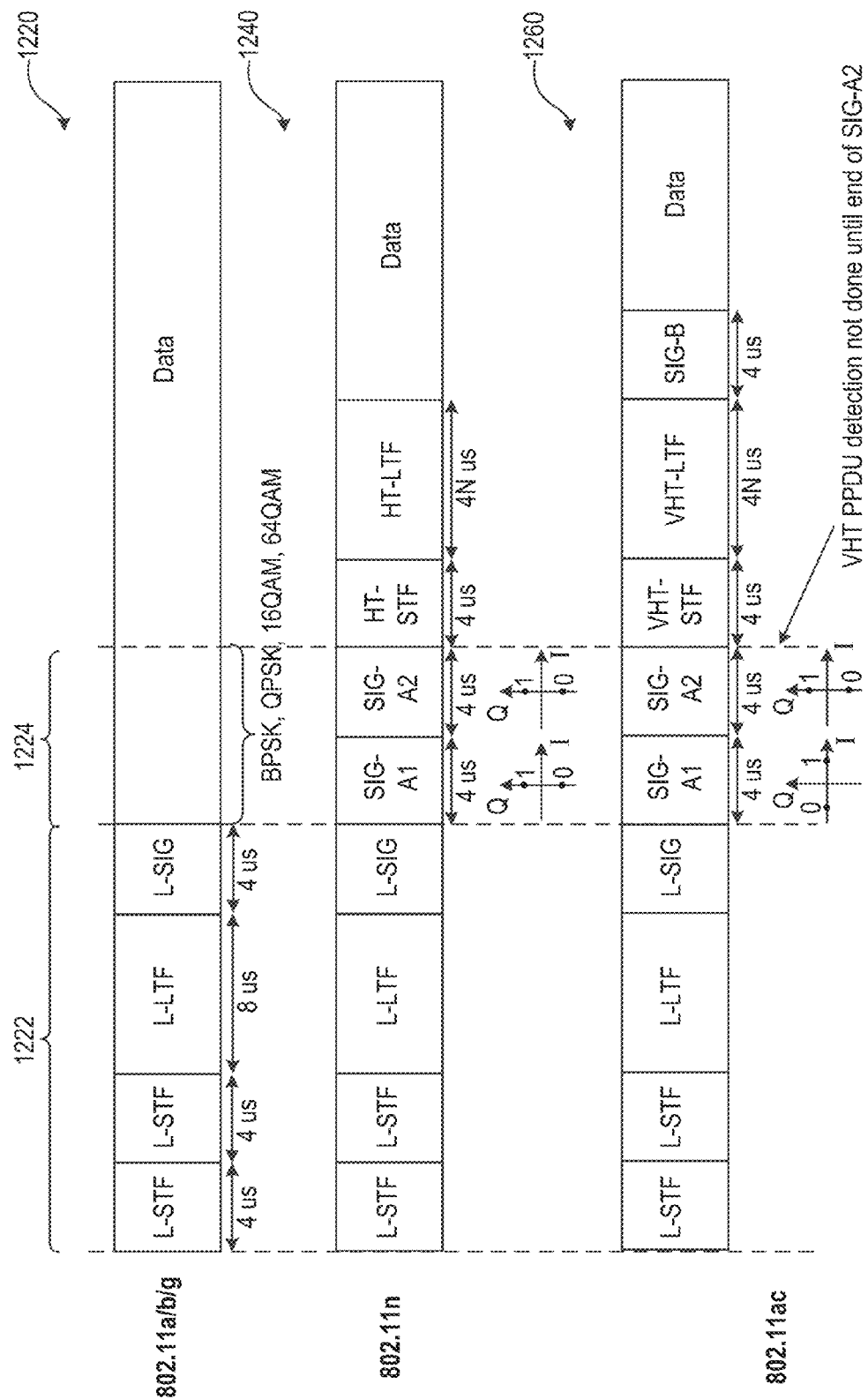
FIG. 12 illustrates examples of existing PPDU formats.

FIG. 12 illustrates examples of existing PPDU formats. A frame 1220 utilizes the PPDU format for IEEE 802.11a, b, and g. A frame 1240 utilizes the HT PPDU format for 802.11n. A frame 1260 utilizes the PPDU format for 802.11ac. In the frames 1220, 1240, and 1260, a portion 1222 includes legacy preamble symbols (e.g., L-STF, L-LTF, and L-SIG symbols). A portion 1224 includes a first symbol immediately following the L-SIG symbol and a second symbol immediately following the first symbol.

In the frame 1220, the portion 1224 includes data symbols of a data field. OFDM symbols of the portion 1224, excluding guard intervals included in the OFDM symbols, may be modulated using any one of binary phase shift keying (BPSK), quadrature phase shift keying (QPSK), 16 quadrature amplitude modulation (16QAM), and 64 quadrature amplitude modulation (64QAM).

In the frame 1240, the portion 1224 includes an OFDM symbol of a SIG-A1 field and an OFDM symbol of a SIG-A2 field. The OFDM symbols of the portion 1224, excluding guard intervals included in the OFDM symbols, may be modulated using quadrature BPSK (QBPSK). As used herein, the QBPSK modulation is the BPSK modulation performed in the quadrature domain rather than the in-phase domain.

In the frame 1260, the portion 1224 includes an OFDM symbol of a SIG-A1 field and an OFDM symbol of a SIG-A2 field. The OFDM symbol of the SIG-A1 field, excluding a guard interval included in the OFDM symbol, may be modulated using BPSK. The OFDM symbol of the SIG-A2 field, excluding a guard interval included in the OFDM symbol, may be modulated using QBPSK.

At a receiver, PPDU format detection among legacy IEEE 802.11a/b/g PPDUs, HT PPDU (IEEE 802.11n), and VHT PPDU (IEEE 802.11ac) may be performed through detection of energy distribution associated with the modulation. For example, the receiver may determine that received frame is of the IEEE 802.11ac format if the two OFDM symbols that follow the L-SIG symbol utilize, in order, BPSK and QBPSK modulation. The receiver may make the assumption that the two OFDM symbols use a 0.8 μs GI length. The VHT PPDU detection may not be done until an entirety of the SIG-A2 field is detected.

Figure 13:
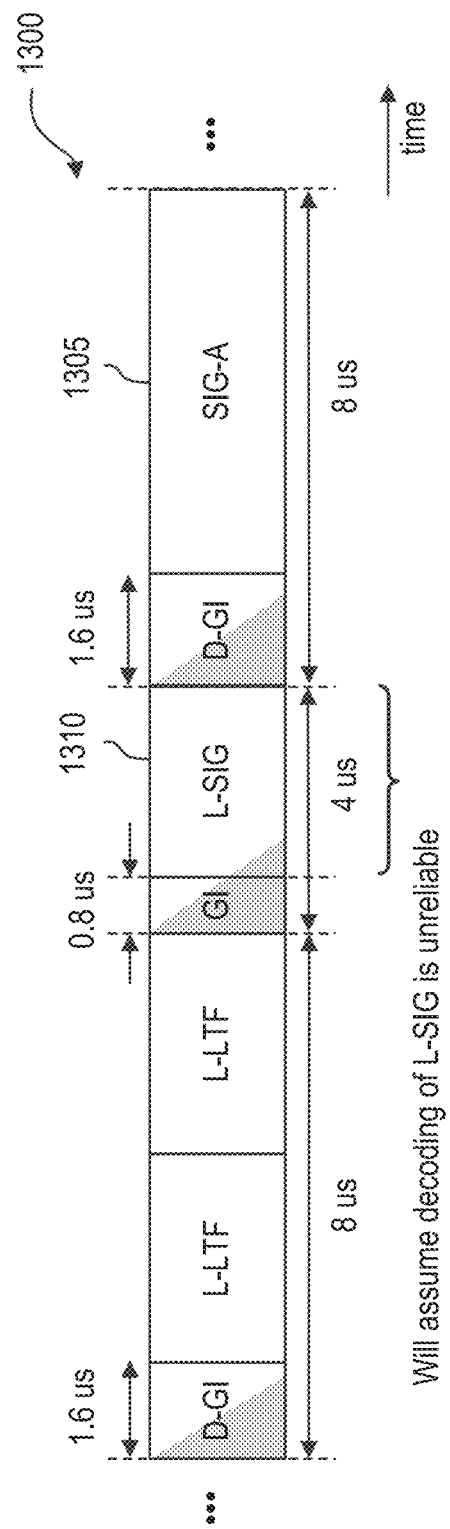
FIG. 13 illustrates an example of a portion of a PPDU format.

FIG. 13 illustrates an example of a portion of a PPDU format 1300. The PPDU format 1300 includes an OFDM symbol 1305, which may be referred to as a SIG-A symbol, to contain control information. The OFDM symbol 1305 may contain the EGI and twice the duration of a regular OFDM symbol duration including the EGI. The duration of the OFDM symbol 1305 may be 8 μs. In some cases, the OFDM symbol 1305 may be associated with half the subcarrier spacing compared to legacy 802.11 systems. For example, the OFDM symbol 1305 may be associated with a 128 FFT/IFFT size for a 20 MHz bandwidth. The OFDM symbol 1305 follows the L-SIG symbol 1310.

Figure 14:
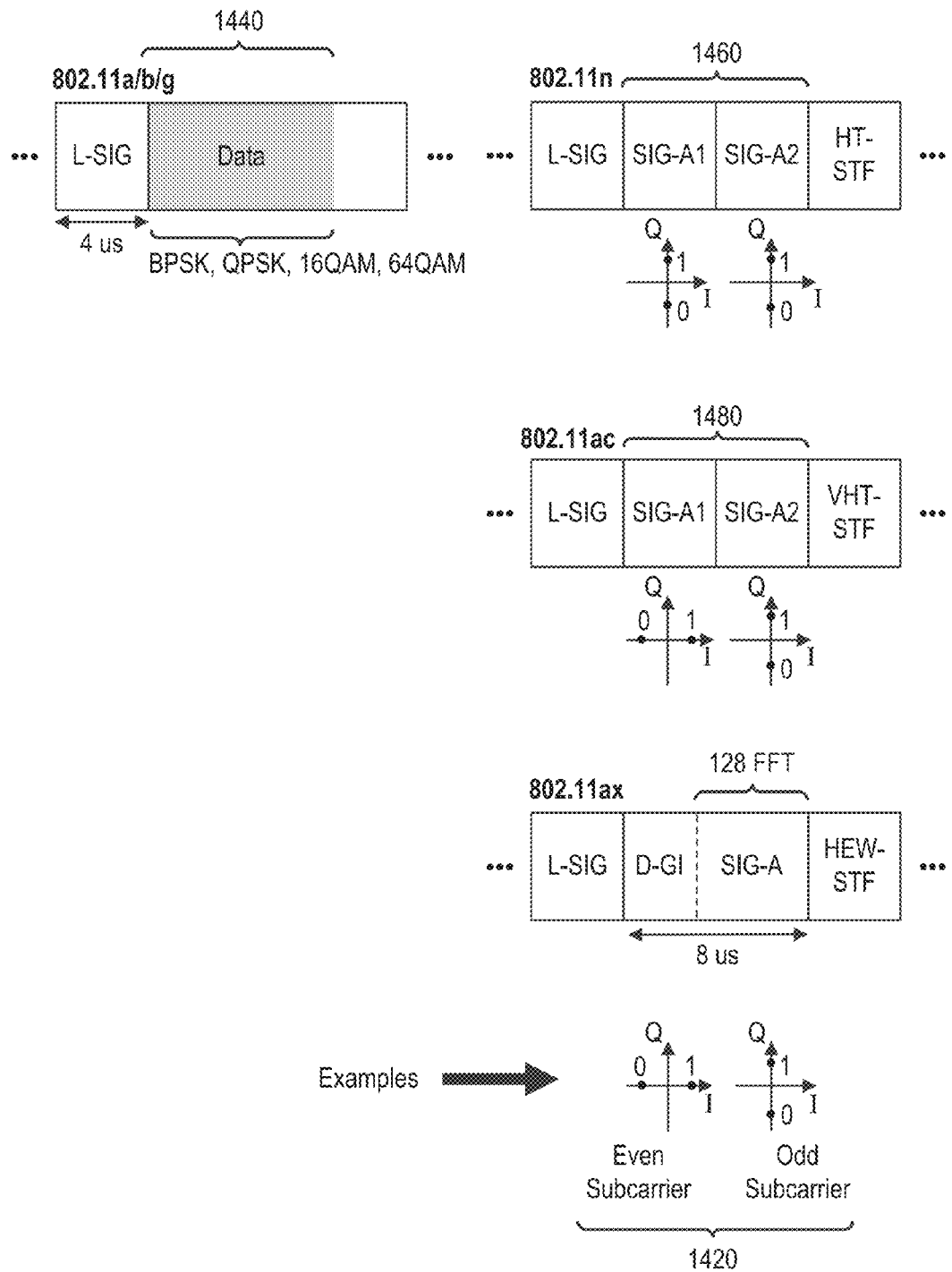
FIG. 14 illustrates examples of modulation schemes for portions of PPDU formats.

At a receiver, detection of the portion of the PPDU format 1300 may be performed in various manners. FIG. 14 illustrates a comparison of modulation mapping schemes of examples of portions of PPDU formats, each following an L-SIG. An example of a modulation mapping scheme for a portion 1420 of the PPDU format 1300 following the L-SIG field may include BPSK modulation at even subcarriers and QBPSK modulation at odd subcarriers. The modulation mapping schemes of portions 1440, 1460, and 1480 were previously described with respect to FIG. 12.

Figure 15:
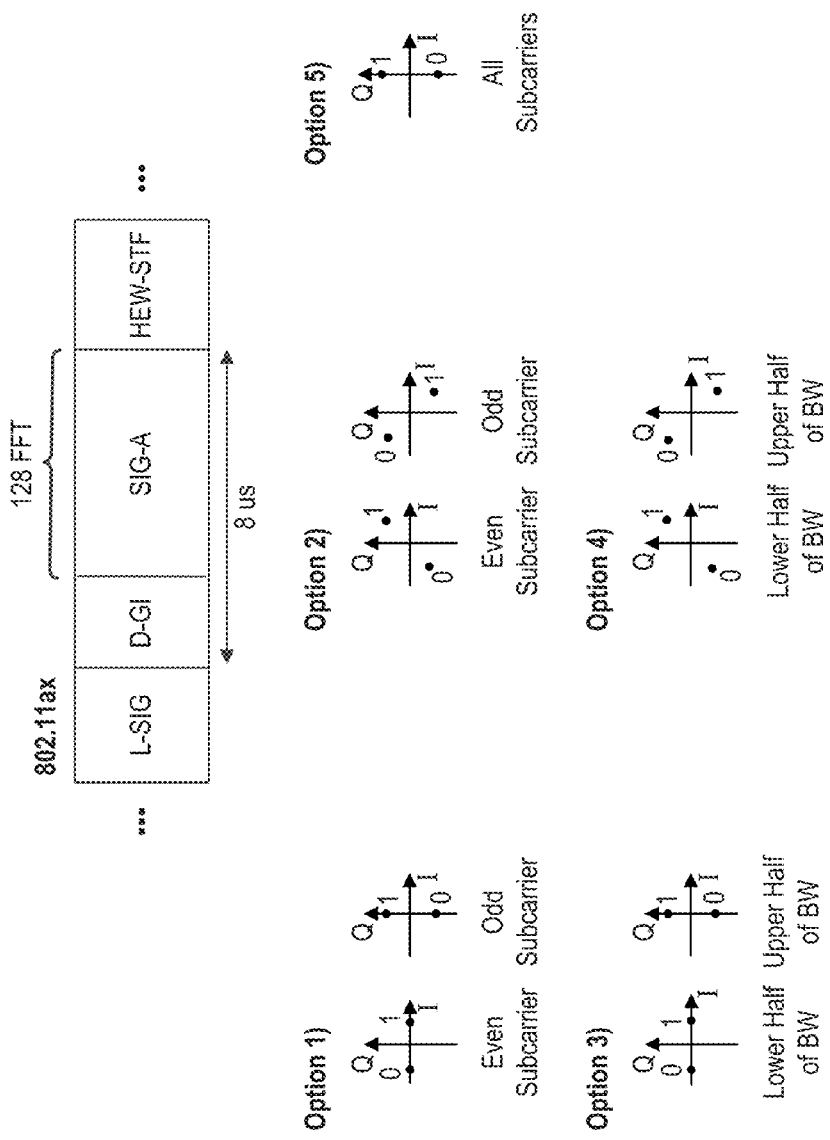
FIG. 15 illustrates examples of modulation schemes for a portion of a PPDU format.

FIG. 15 illustrates possible modulation mapping schemes for a SIG-A. For example, option 1 includes BPSK modulation at even subcarriers and QBPSK modulation at odd subcarriers, as described with respect to FIG. 14. The other options include various modulation with in-phase and/or quadrature components utilized for some or all subcarriers. The options for the modulation mapping scheme are provided by way of non-limiting example, and other options for the modulation mapping scheme are possible.

Even subcarriers are those subcarriers that are associated with even indices. Odd subcarriers are those subcarriers that are associated with odd indices. The subcarrier associated with zero index may be referred to as a direct current (DC) tone. A lower half of a channel bandwidth (BW) may include subcarriers with indices below zero (e.g., −122 to −1 for 20 MHz channel bandwidth). An upper half of a channel bandwidth may include subcarriers with indices above zero (e.g., 1 to 122 for 20 MHz channel bandwidth). In some cases, the subcarrier associated with zero index may be considered as part of the lower half or the upper half.

The denoted subcarriers in FIG. 15 may refer to either logical subcarriers that can contain control signal information (e.g., subcarriers enumerated excluding subcarriers carrying pilots or DC tones), or the physical subcarrier (e.g., subcarriers enumerated including subcarriers carrying pilots or DC tones). Furthermore, the even and odd subcarrier modulation mapping scheme or the lower and upper bandwidth subcarrier modulation scheme (e.g., options 1, 2, 3, and 4) may be swapped such that even subcarriers are using odd subcarrier mapping, and odd subcarriers are using even subcarrier mapping or lower bandwidth modulation is using the upper bandwidth mapping, and vice versa.

The modulation mapping schemes shown in options 1 through 4 of FIG. 15 have distinct modulation scheme compared with legacy, HT, and VHT PPDU formats (e.g., shown in FIG. 14). On the other hand, the modulation mapping scheme shown in option 5 has an identical modulation mapping scheme of HT PPDU format from the modulation perspective. It is noted that, even with the modulation mapping scheme shown in option 5, it is possible to allow backwards compatibility with the legacy, HT, and VHT devices by causing these devices to identify that the HE PPDU with EGI as having a legacy PPDU format, as described with respect to FIG. 16. Causing the legacy, HT, and VHT devices to detect the HE PPDU as a legacy PPDU format may be referred to as spoofing.

Figure 16:
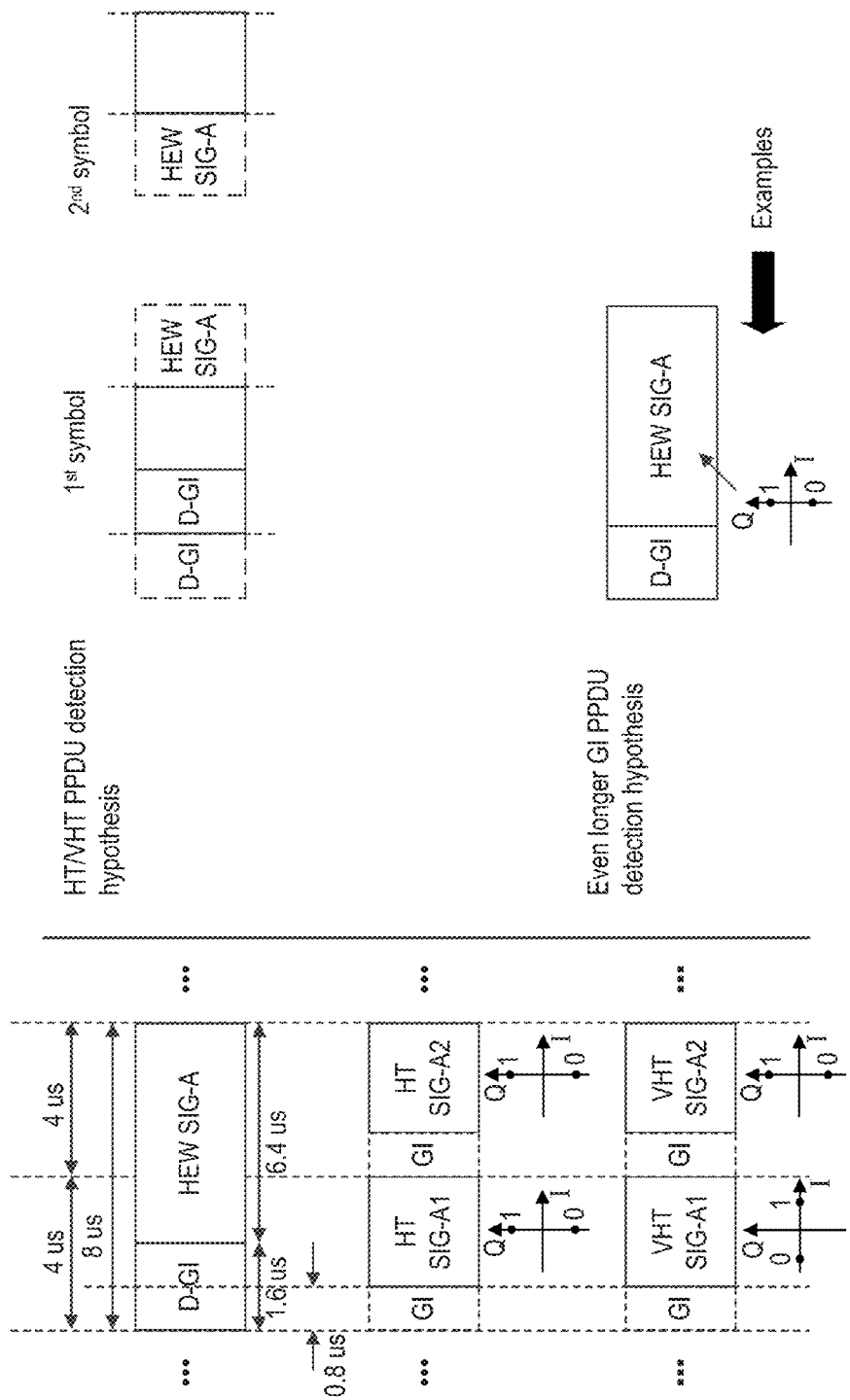
FIG. 16 illustrates a PPDU detection method that may be performed by high throughput (HT) or very high throughput (VHT) devices receiving the PPDU format of FIG. 13.

FIG. 16 illustrates a PPDU detection method that may be performed by HT or VHT devices receiving a PPDU format 1300 with EGI. Upon receiving the HE PPDU, receivers of the HT or VHT devices may take a portion of a guard interval (e.g., a cyclic prefix) and a portion of a 128 sample (from 128 FFT/IFFT size) OFDM symbol as a SIG-A1 OFDM symbol (e.g., HT SIG-A1, VHT SIG-A1), and take the last 64 samples of the 128 sample (from 128 FFT/IFFT) OFDM symbol as a SIG-A2 OFDM symbol. In an aspect, for a first symbol, in the time-domain, a cyclically shifted version of SIG-A may be used for detection. For example, a portion (e.g., half) of the OFDM symbol duration for SIG-A may be used for detection. The portion may contain ISI from the L-SIG field. In an aspect, for a second symbol, a portion (e.g., half) of the OFDM symbol duration for SIG-A may be used for detection.

Frequency domain transformation of a portion of a signal corresponding to the SIG-A1 time duration may result in an FFT of a time shifted and a time domain window filtered signal of an original transmitted signal. This may not only cause creation of a spread of the modulated symbol in frequency but also cause phase rotation of each modulated symbol, where an amount of phase rotation is a function of subcarrier index. For example, if $x_t$ is the original signal (e.g., 128 samples), and its frequency domain representation is $X_f$, the HT and VHT receivers receive $\hat{X}_f$, where $\hat{X}_f$ is as given below:

$$X_f = \sum x_t e^{-j\frac{2\pi}{N}tf}$$

$$\hat{x}_t = \hat{x}_{(t-K) \bmod N} \cdot g_t, \quad g_t = \begin{cases} 1, & 0 \le t < \frac{N}{2} \\ 0, & \frac{N}{2} \le t \end{cases}$$

$$\hat{X}_f = \sum \hat{x}_t e^{-j\frac{\pi}{N}tf}$$

where N is the number of samples (e.g., 128) and $g_t$ is a windowing function.

The received signal $\hat{X}_f$ may be referred to as a detected signal. As shown in the above equations, the detected signal $\hat{X}_f$ may be an anti-aliased, linearly phase rotated, and frequency widened signal relative to the frequency domain representation $X_f$ of the original signal. Therefore, the modulated signal energy is spread across both in-phase and quadrature domains, even in the case that option 5 is utilized. Because the energy of the modulated signal is spread across both the in-phase and quadrature domains, the HT and VHT device may not detect the PPDU format 1300 with EGI as an HT PPDU or a VHT PPDU, but rather as a legacy PPDU format. As previously indicated, the detection of the PPDU format 1300 as a legacy PPDU format by the HT and VHT devices allow backwards compatibility of IEEE 802.11ax.

Figure 17:
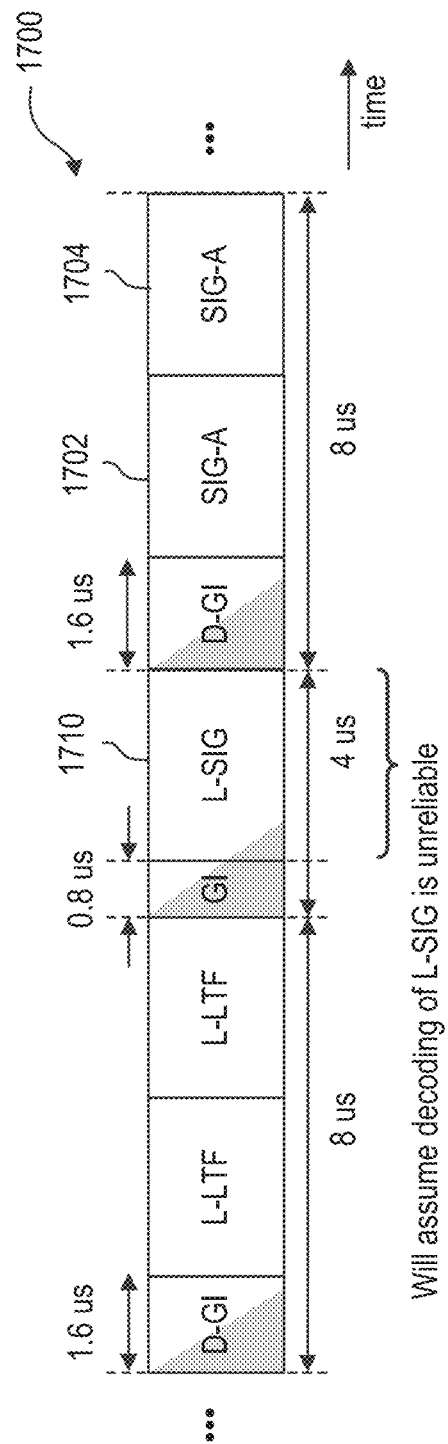
FIG. 17 illustrates an example of a portion of a PPDU format.

FIG. 17 illustrates an example of a portion of a PPDU format 1700. The PPDU format 1700 includes two OFDM symbols 1702 and 1704 with EGI right after the L-SIG symbol 1710. The two OFDM symbols 1702 and 1704 may contain control information and may be referred to as SIG-A symbols. The two OFDM symbols 1702 and 1704 may be duplicated without a GI between them. Therefore, after the L-SIG symbol 1710, the EGI, SIG-A, and SIG-A are transmitted sequentially. The OFDM symbols 1702 and 1704 each have a duration of 3.2 μs, which is identical to legacy OFDM symbol duration.

Figure 18:
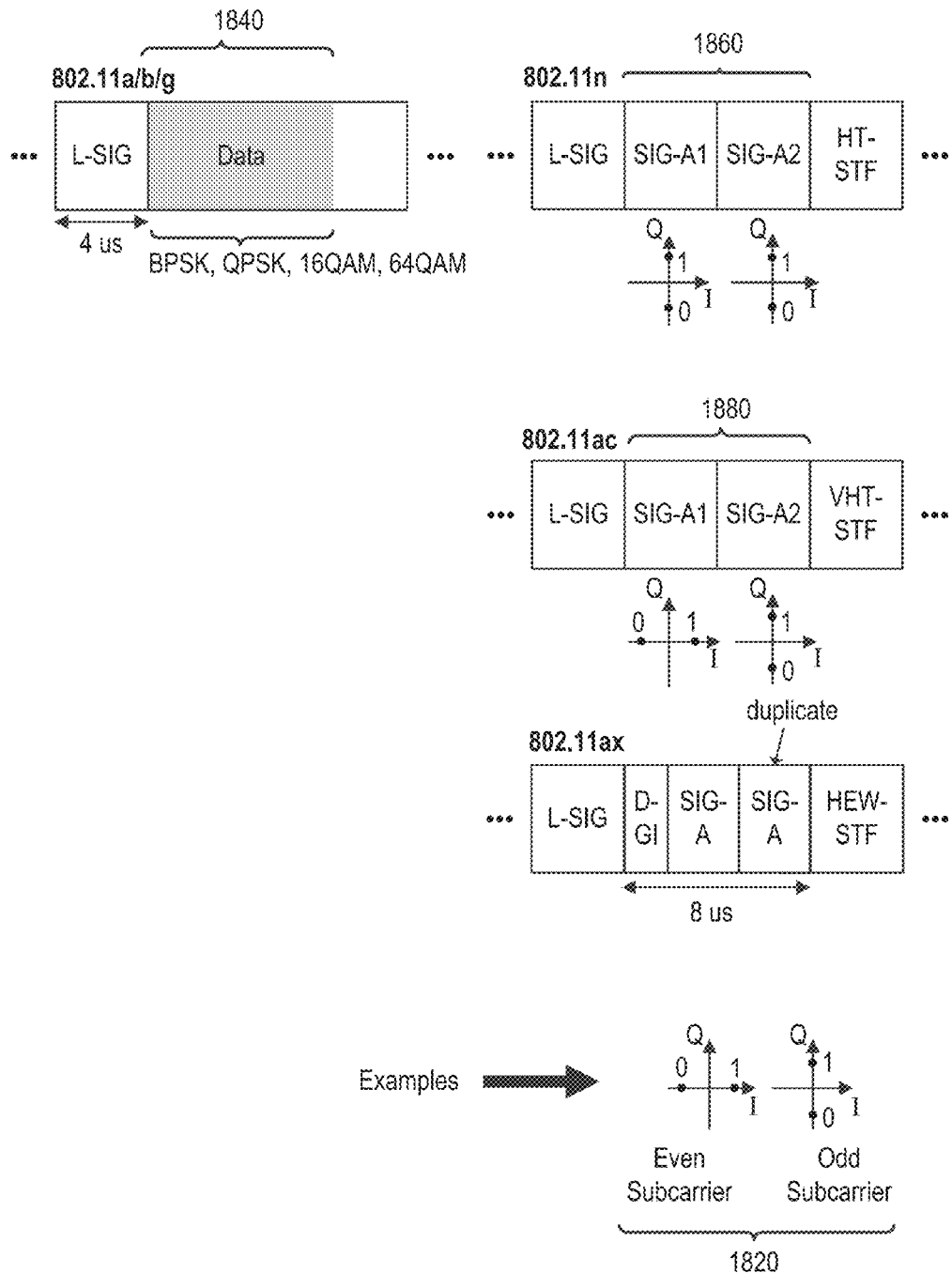
FIG. 18 illustrates examples of modulation schemes for portions of PPDU formats.

At a receiver, detection of the PPDU format 1700 may be performed in various manners. FIG. 18 illustrates a comparison of modulation mapping schemes of examples of portions of PPDU formats, each following an L-SIG. An example of a modulation mapping scheme for a portion 1820 of the PPDU format 1700 following the L-SIG may include BPSK modulation at even subcarriers and QBPSK modulation at odd subcarriers. The modulation mapping schemes of portions 1840, 1860, and 1880 were previously described with respect to FIG. 12.

Figure 19:
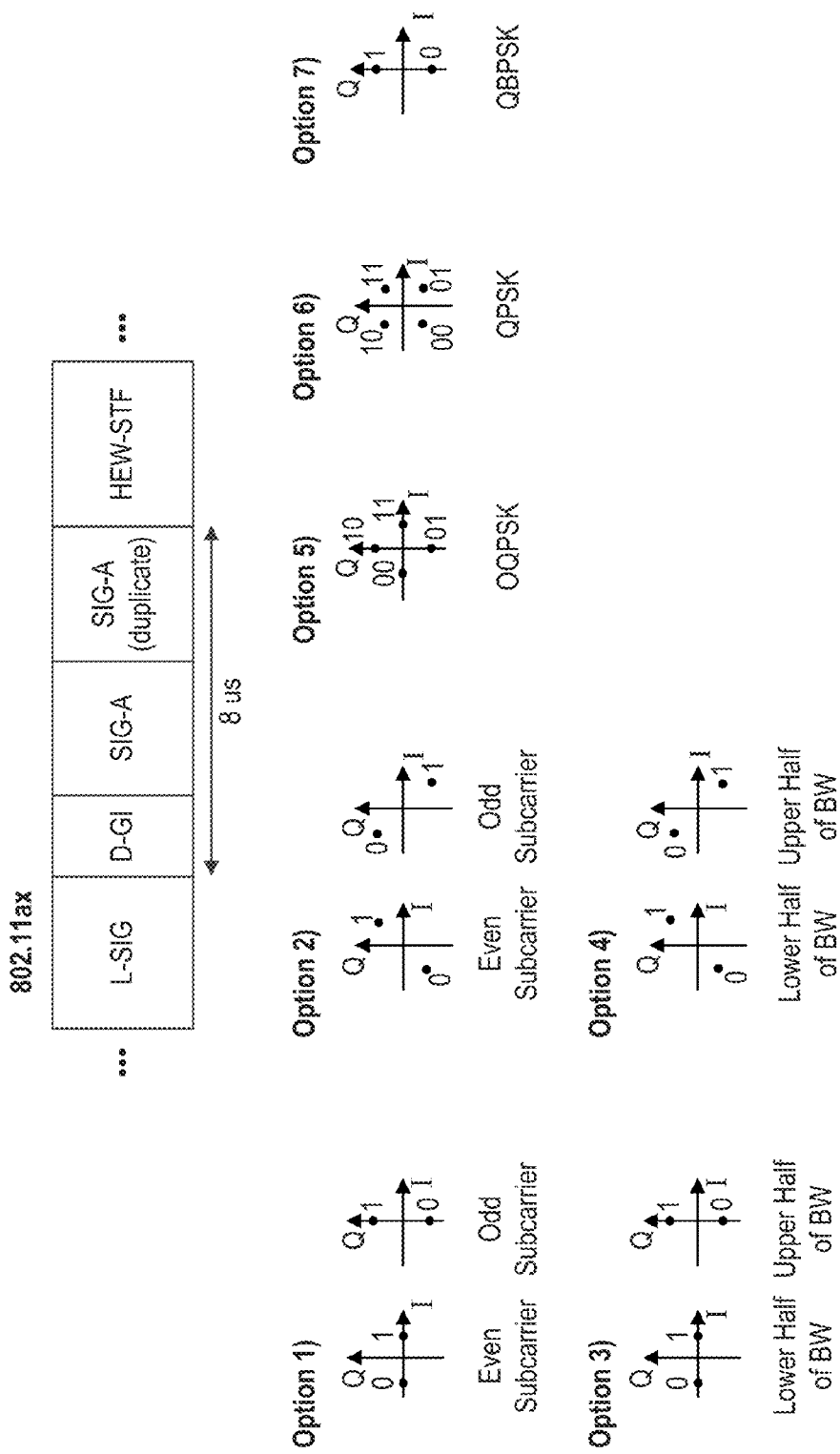
FIG. 19 illustrates examples of modulation schemes for a portion of a PPDU format.

FIG. 19 illustrates other possible modulation mapping schemes for a SIG-A. The options include various modulation with in-phase and/or quadrature components utilized for some or all subcarriers. For example, option 5 includes orthogonal QPSK (OQPSK), in which a modulation symbol is along only one of the in-phase or quadrature domain. The options for the modulation mapping scheme are provided by way of non-limiting example, and other options for the modulation mapping scheme are possible.

In addition to use of the modulation mapping scheme to detect the PPDU format 1700, the PPDU format 1700 may be detected at the receiver based on detection of the consecutive and duplicate SIG-A OFDM symbol duration (without GI between). None of the existing PPDU formats (e.g., IEEE 802.11a, b, g, n, ac) have a consecutive and duplicate OFDM symbol scheme. The receivers may detection the PPDU format 1700 based on detecting the consecutive and duplicate SIG-A OFDM symbol rather than using the modulation mapping scheme for detection in the case of options 5, 6, and 7. The modulation mapping scheme option 5 or 6 may allow more encoded information to be transmitted in the SIG-A OFDM symbol compared with BPSK or BPSK derivative modulation techniques (e.g., QBPSK). Furthermore, the even and odd subcarrier modulation scheme or the lower and upper bandwidth subcarrier modulation mapping scheme (e.g., option 1, 2, 3, and 4) may be swapped such that even subcarriers are using odd subcarrier mapping, and odd subcarriers are using even subcarrier mapping or lower bandwidth modulation is using the upper bandwidth mapping, and vice versa.

Figure 20:
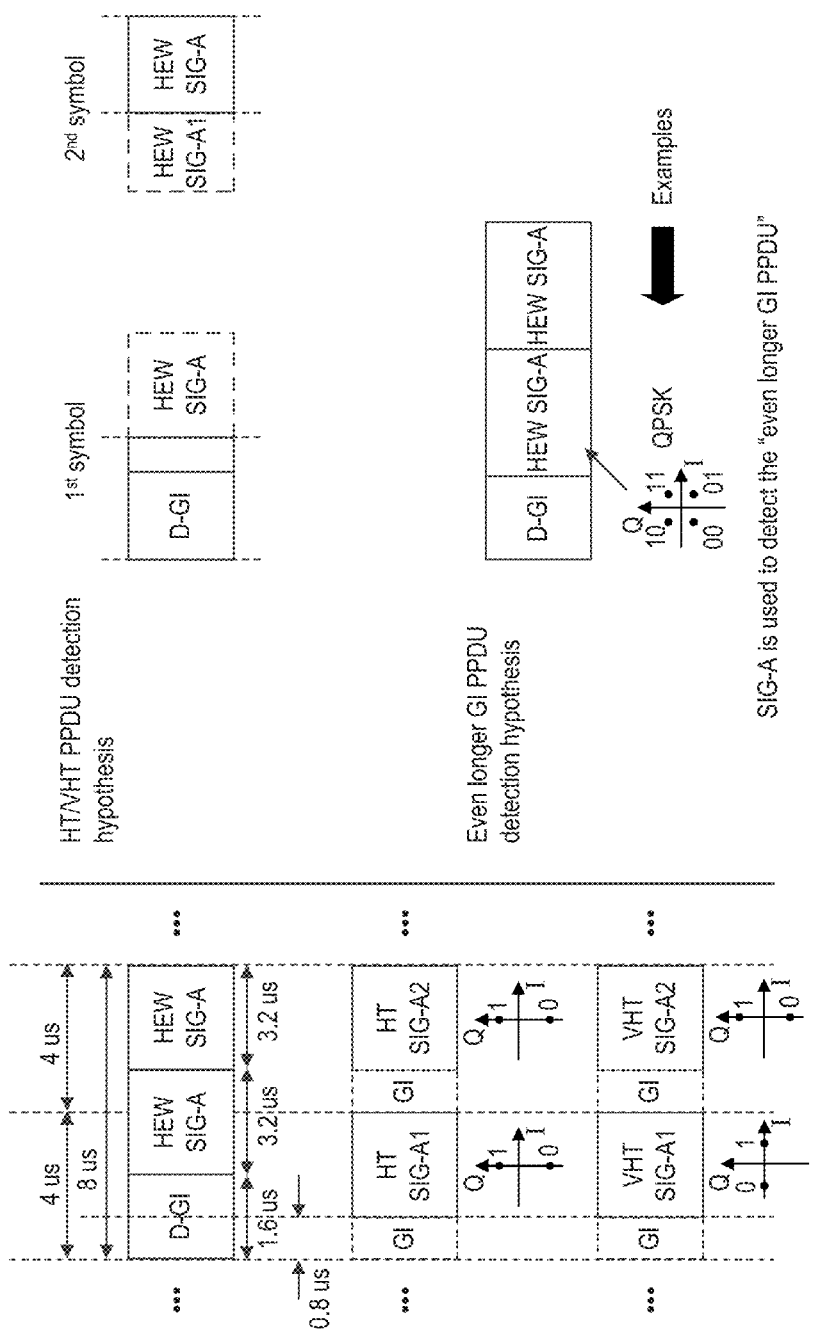
FIG. 20 illustrates a PPDU detection method that may be performed by HT or VHT devices receiving the PPDU format of FIG. 17.

FIG. 20 illustrates a PPDU detection method that may be performed by HT or VHT devices receiving a PPDU format 1700 with EGI. When HT and VHT devices receive the PPDU format 1700, a first symbol corresponding to HT-SIG-A1 or VHT-SIG-A1 will be detecting a cyclic shifted version of SIG-A symbol. The first symbol may contain ISI from the L-SIG field. Therefore, the phase rotated modulated symbols of SIG-A will be detected by the FIT and VIII devices. However, a second SIG-A symbol corresponding to HT-SIG-A2 or VHT-SIG-A2 will be perfectly aligned for OFDM detection and correct modulated symbols of SIG-A will be detected by HT and VHT devices. Thus, correct detection of the second SIG-A symbol is possible. Mathematically, reception of a cyclically shifted OFDM symbol results in phase rotated modulated symbols in the frequency domain. If $x_t$ is the time domain signal of interest and $X_f$ is the frequency domain signal of $x_t$, the frequency domain signal of cyclically shifted $x_t$ results in frequency domain signal $X'_f$ and can be represented as the following:

$$X_f = \sum_{t=1}^{N} x_t e^{j\frac{2\pi}{N}tf}$$

$$X'_f = x_{N-t_0} e^{j\frac{2\pi}{N}f \cdot 0} + x_{N-t_0+1} e^{j\frac{2\pi}{N}f \cdot 1} + x_{N-t_0+2} e^{j\frac{2\pi}{N}f \cdot 2} + \ldots +$$

$$x_{N-1} e^{j\frac{2\pi}{N}(t-t_0)f} + x_0 e^{j\frac{2\pi}{N}(t-t_0)f}$$

$$= \sum_{t=0}^{N-1} x_t e^{j\frac{2\pi}{N}(t-t_0)f}$$

$$= \left( \sum_{t=1}^{N} x_t e^{j\frac{2\pi}{N}tf} \right) e^{-j\frac{2\pi}{N}t_0 f}$$

$$= X_f \cdot e^{-j\frac{2\pi}{N}t_0 f}$$

From $X'_f$ above, the frequency domain signal is phase rotated, where the rotated phase value is a function of subcarrier index f. For example, if 0.8 μs is cyclically shifted in time domain for an OFDM symbol with 3.2 μs DFT duration (i.e., subcarrier spacing of 312.5 kHz), $t_0$ corresponds to 16 samples and N corresponds to 64 samples in the above equations. Therefore, $$X'_f = X_f \cdot e^{-j\frac{2\pi}{64}16f} = X_f \cdot e^{-j\frac{\pi}{2}f}.$$

The rotated phase values that are multiplied in frequency domain are values whose absolute value is 1, for example {+1, +j, −1, −j}. Values with an absolute value of 1 may be referred to as unit norm values. Thus, a complex valued sequence consisting of {+1, +j, −1, −j} can be multiplied to frequency domain signals to generate a cyclically shifted OFDM symbol. In some embodiments, the complex valued sequence can consist of at least two of the values +1, +j, −1, and −j. For example, the complex valued sequence can consist of +1 and −1, the complex valued sequence can consist of +j and −j, and the complex valued sequence can consist of +1, −1, +j, and −j.

Thus, spoofing the legacy devices (e.g., IEEE 802.11a, b, g, n, ac) may be performed when a combination of phase rotated modulated symbols of SIG-A and (regular) modulated symbols of SIG-A is different from the HT-SIG-A1/HT-SIG-A2 and VHT-SIG-A1/VHT-SIG-A2 OFDM symbol pair.

Figure 21:
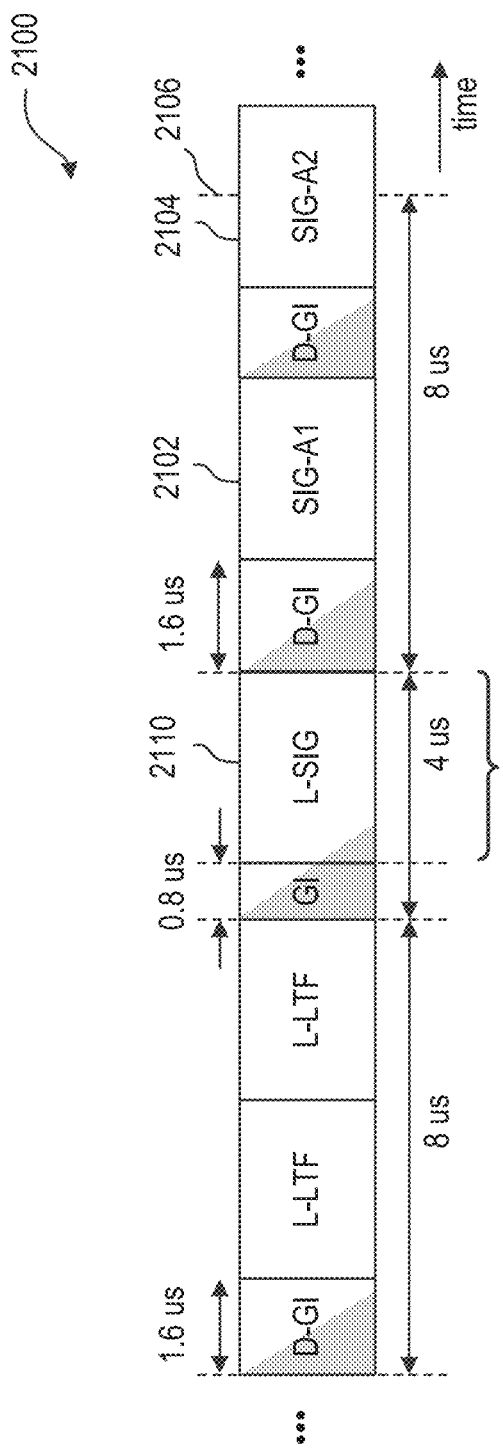
FIG. 21 illustrates an example of a portion of a PPDU format.

FIG. 21 illustrates an example of a portion of a PPM format 2100. The PPDU format 2100 includes two OFDM symbols 2102 and 2104 with EGI (shown as D-GI in the figure) right after the L-SIG symbol 2110. The OFDM symbol 2102 and the OFDM symbol 2104 may be referred to as a SIG-A1 and a SIG-A2 symbol, respectively. The two OFDM symbols 2102 and 2104 each include an EGI and thus may be protected from large channel delay spread. The OFDM symbol alignment of the preamble with legacy PPDU formats is lost after L-SIG OFDM symbol, as represented by a line 2106.

Figure 22:
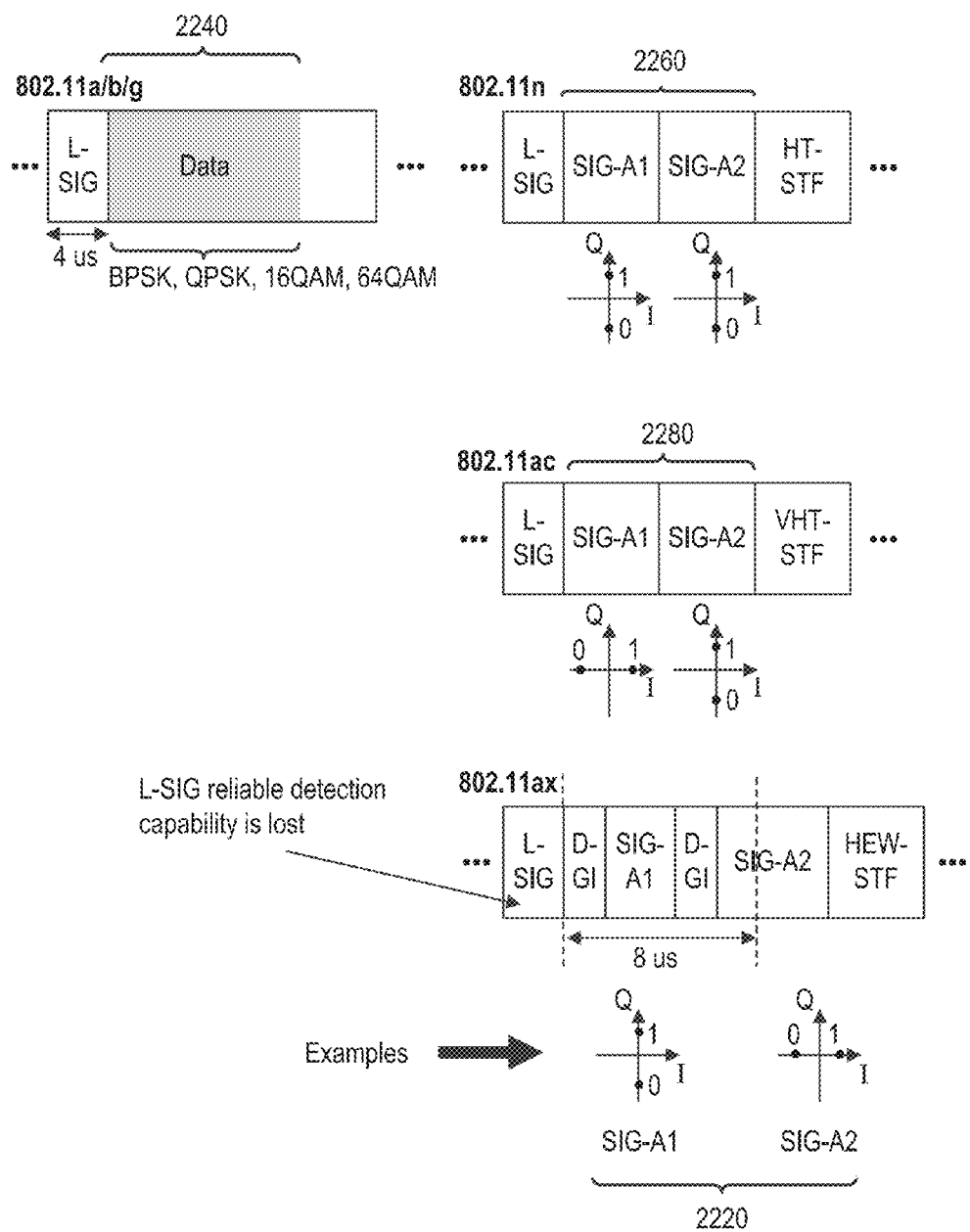
FIG. 22 illustrates examples of modulation schemes for portions of PPDU formats.

At a receiver, detection of the PPDU format 2100 may be performed in various manners. FIG. 22 illustrates a comparison of modulation mapping schemes of examples of portions of PPDU formats, each following an L-SIG. The detection of the PPDU format 2100 may be performed utilizing a particular modulation mapping scheme in the modulated symbols of SIG-A. If detection of the PPDU format 2100 needs to be performed within the 8 μs time window right after the L-SIG, SIG-A1 may be utilized to detect the PPDU format 2100.

Figure 23:
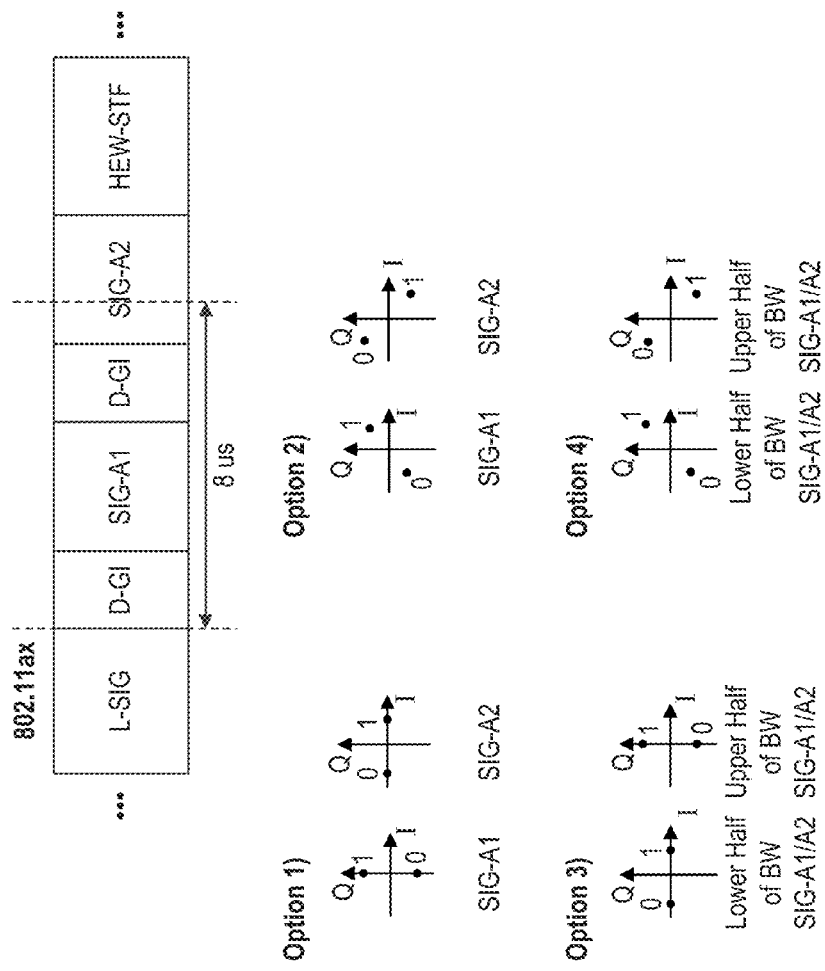
FIG. 23 illustrates examples of modulation schemes for a portion of a PPDU format.

FIG. 23 illustrates examples of modulation mapping schemes that may be used in SIG-A1 and SIG-A2. Furthermore, the even and odd subcarrier modulation mapping scheme or the lower and upper bandwidth subcarrier modulation mapping scheme (e.g., option 1, 2, 3, and 4) may be swapped such that even subcarriers are using odd subcarrier mapping, and odd subcarriers are using even subcarrier mapping or lower bandwidth modulation is using the upper bandwidth mapping, and vice versa. The options for the modulation mapping scheme are provided by way of non-limiting example, and other options for the modulation mapping scheme are possible.

Figure 24:
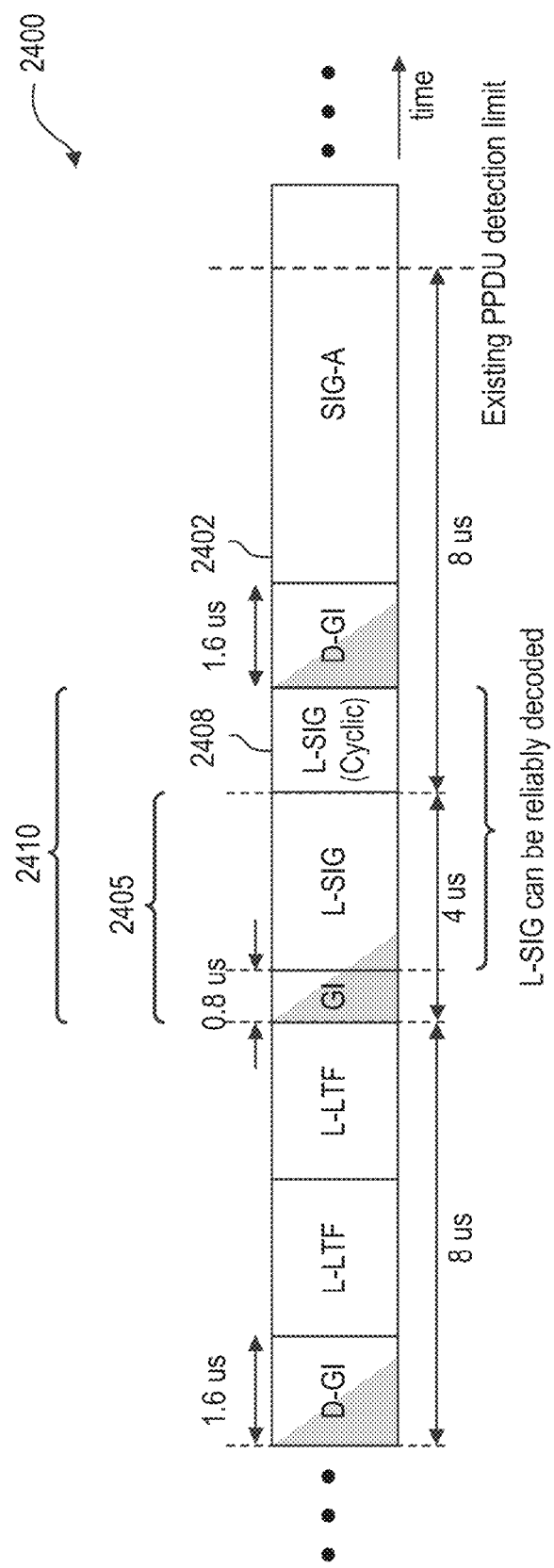
FIG. 24 illustrates an example of a portion of a PPDU format.

FIG. 24 illustrates an example of a portion of a PPDU format 2400. As illustrated by an extended L-SIG block 2410, the PPDU format 2400 cyclically extends the L-SIG OFDM symbol of the L-SIG field 2405 to form a cyclically extended L-SIG 2408. After the cyclically extended L-SIG 2408, the SIG-A OFDM symbol 2402 with EGI is sent. The cyclic extension of the L-SIG OFDM symbol to form the cyclically extended L-SIG 2408 allows devices that can detect the PPDU format 2400 to correctly decode L-SIG even with large channel delay spreads. In an aspect, devices may have an 8 μs PPDU detection limit that starts from a beginning of the cyclically extended L-SIG 2408. In some cases, as shown in FIG. 24, the SIG-A OFDM symbol 2402 may extend beyond the 8 μs PPDU detection limit, such that the PPDU detection limit ends within the SIG-A OFDM symbol 2402. In other cases, an end of the SIG-A OFDM symbol 2402 may be prior to or equal to an end of the 8 μs PPDU detection limit.

Figure 25:
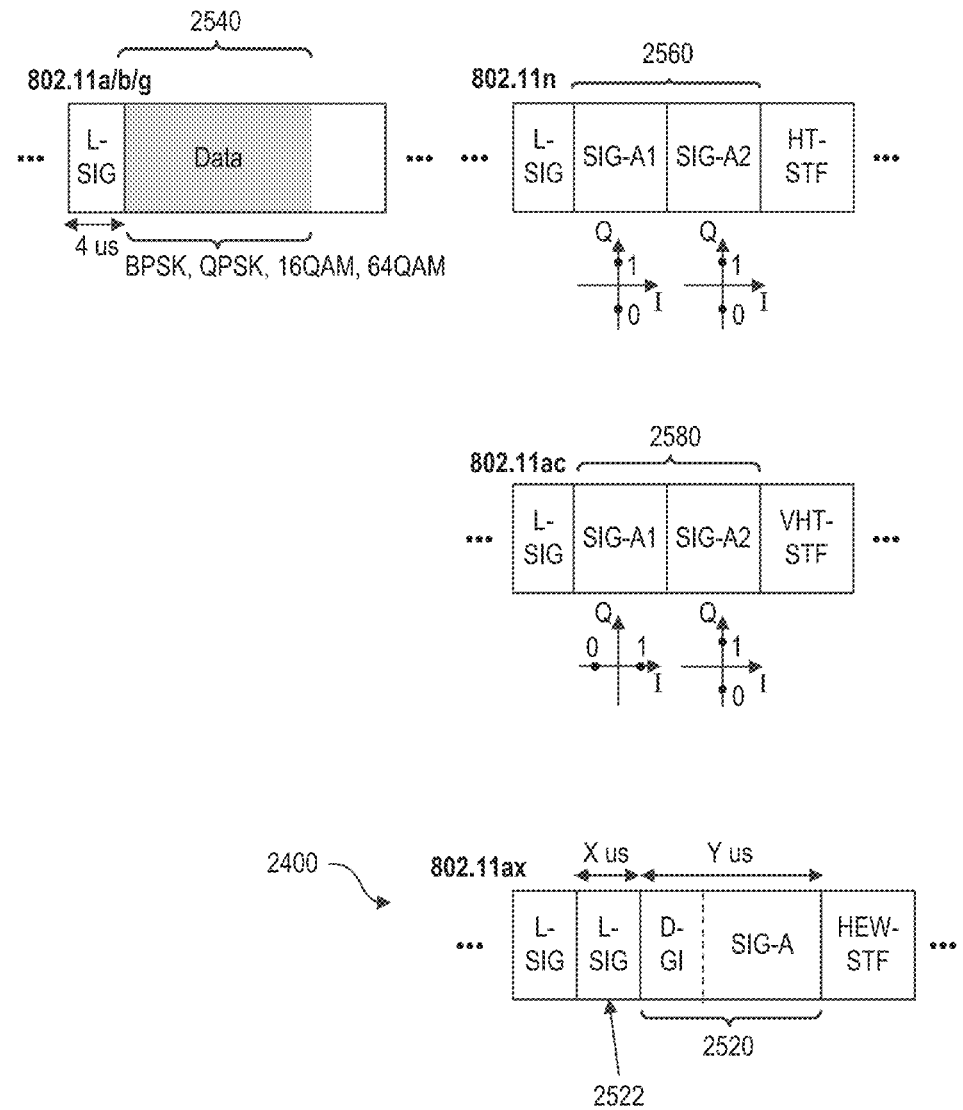
FIG. 25 illustrates examples of modulation schemes for portions of PPDU formats.

At a receiver, detection of the PPDU format 2400 may be performed in various manners. FIG. 25 illustrates a comparison of modulation schemes of portions of PPDU formats, each following an L-SIG. The modulation schemes of portions 2520, 2540, 2560, and 2580 may be the same or similar to the respective modulation schemes described in previous figures such as FIGS. 14 and 15. The PPDU format 2400 includes a cycle postfix 2522 of L-SIG. In an aspect, the cycle postfix 2522 may allow correct detection of L-SIG even with large channel delay spread.

Figure 26:
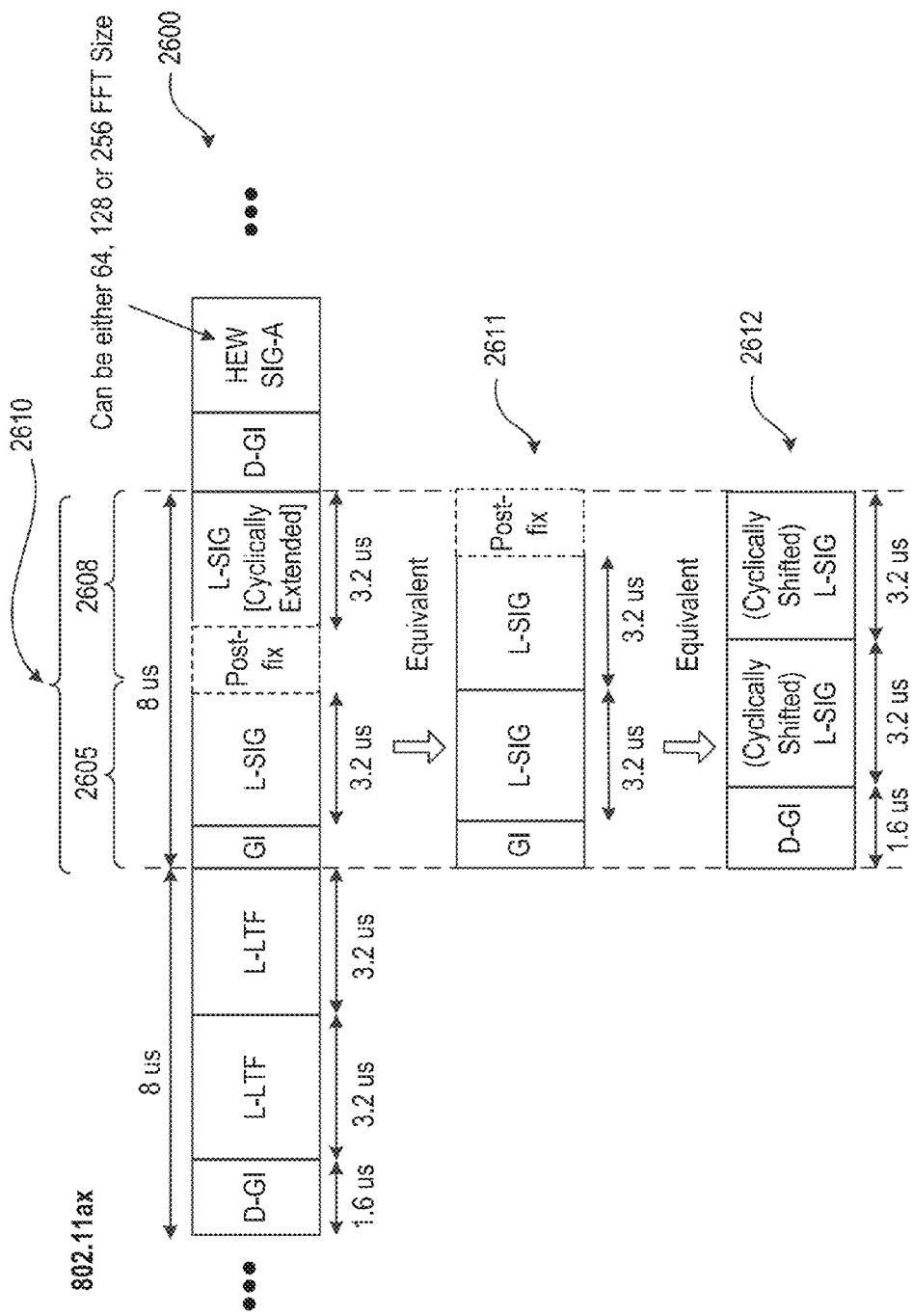
FIG. 26 illustrates examples of portions of a PPDU format.

FIG. 26 illustrates examples of portions of a PPDU format 2600. As illustrated by a block 2610 (which includes an L-SIG field 2605 and a cyclically extended L-SIG field 2608), the L-SIG field 2605 may include a GI (e.g., 0.8 μs) immediately preceding an L-SIG (e.g., 3.2 μs). The cyclically extended L-SIG field 2608 may include a postfix (e.g., 0.8 μs), which immediately follows the L-SIG of the field 2605. The cyclically extended L-SIG field 2608 may also include a cyclically extended version of the L-SIG (e.g., 3.2 μs), which immediately follows the postfix. Use of the postfix may allow the phase between symbols to be continuous. As described above, the cyclically extended L-SIG field 2608 may be also implemented by multiplying a unit norm complex value with linearly increasing phase to the modulated BPSK symbols in frequency domain. The unit norm complex value with linearly increasing phase will result in one of the {+1, +j, −1, −j} complex values. Therefore, the cyclically extended L-SIG field 2608 may be also implemented by multiplying one of the {+1, +j, −1, −j} complex values to each of the modulated BPSK symbols of the L-SIG field 2605 in the frequency domain.

As illustrated by a block 2611, the cyclically extended L-SIG field 2608 may be equivalently represented by the L-SIG (e.g., 3.2 μs) and a postfix (0.8 μs), where the postfix immediately follows the L-SIG. In this regard, the L-SIG is duplicated in the time domain consecutively without a GI between.

As illustrated by a block 2612, the block 2610 may be equivalently represented by a single EGI (which is, in this example, shown as D-GI with a duration of 1.6 μs) and two identical cyclically shifted versions of the L-SIG (e.g., 3.2 μs each). In this case, the two cyclically shifted versions of the L-SIG immediately follow the EGI.

The GI may be a cyclic prefix of its associated signal (e.g., a cyclic prefix of the L-SIG that immediately follows the GI). The EGI may be a cyclic prefix of its associated signals (e.g., a cyclic prefix of the two cyclically shifted L-SIGs that immediately follow the EGI). A postfix may be a cyclic postfix of its associated signal (e.g., a cyclic postfix of the L-SIG that immediately precedes the postfix).

Receivers of an HE frame may identify and decode the HE frame 2600 using any one of the equivalent structures shown in FIG. 26. Therefore, receivers may be able to correctly decode the L-SIG without ISI even in large channel spread scenarios. The SIG-A OFDM symbol, which may utilize an EGI (shown as D-GI), may be sent right after the cyclically extended L-SIG 2608.

Figure 27:
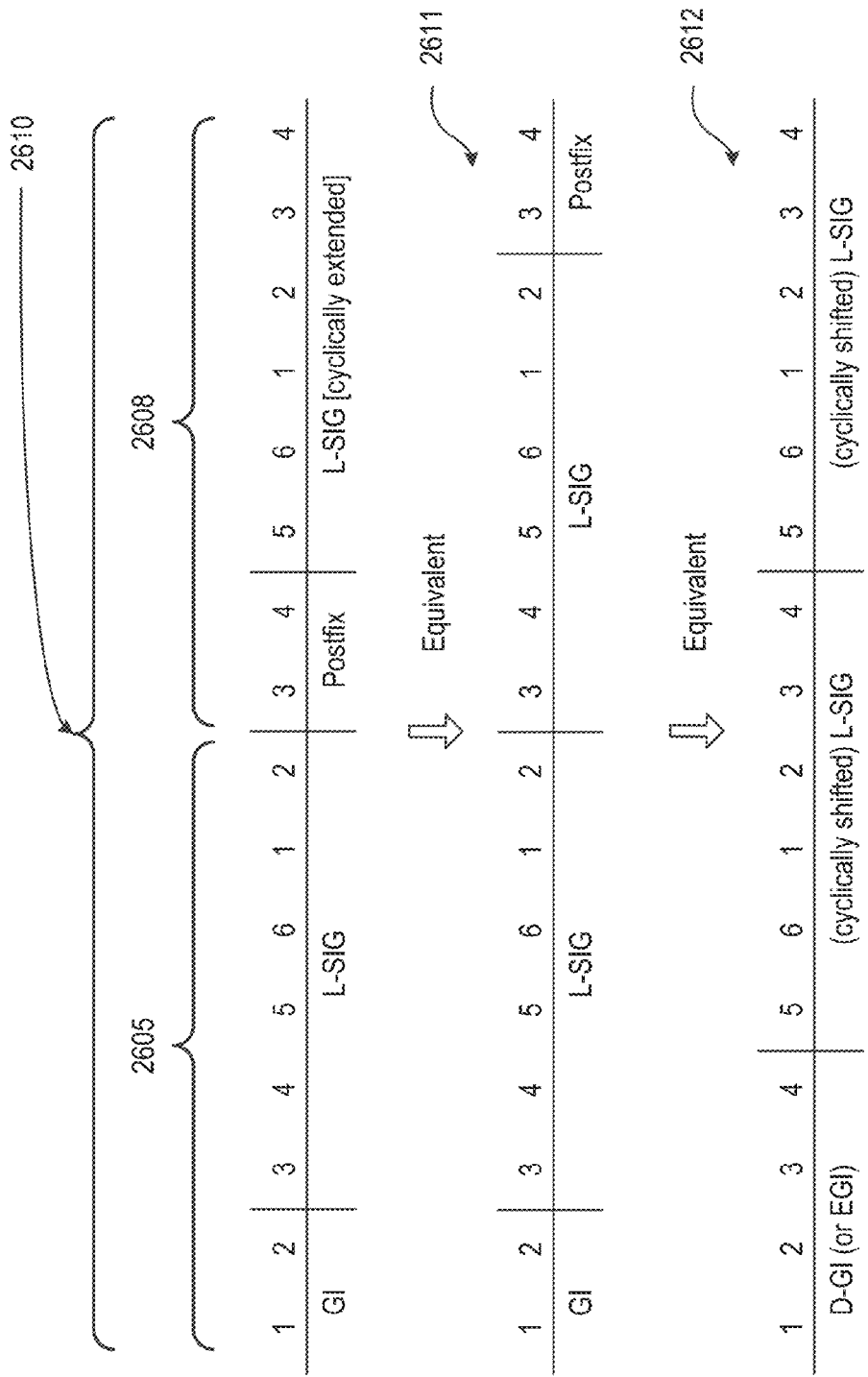
FIG. 27 illustrates simplified examples of equivalent representations of the blocks shown in FIG. 26.

FIG. 27 illustrates simplified examples of equivalent representations of the blocks 2610, 2611 and 2612 of FIG. 26 in time domain. For illustration purposes only, values 1 through 6 are used. The values 1 through 6 may represent a sequence of samples. As shown in FIG. 27, the equivalent representations of the blocks 2610, 2611 and 2612 are mathematically equivalent from a sample-by-sample basis.

While six samples are shown in FIG. 26, additional samples may be utilized. For example, each of L-SIG and cyclically shifted/extended versions thereof may include 64 samples, GI may include 16 samples, and EGI (or D-GI) may include 32 samples. In one aspect, the values 1 through 6 shown in FIG. 27 may represent some of these samples. A rear portion of the L-SIG field 2605 may include the sequence {3, 4, 5, 6, 1, 2}. A rear portion of the cyclically extended L-SIG field 2608 may include the sequence {5, 6, 1, 2, 3, 4}. A front portion of the cyclically extended L-SIG field 2608 may include the sequence {3, 4, 5, 6, 1, 2}. As shown in FIG. 27, content (e.g., values of the sequence) of the rear portion of the L-SIG field 2605 is the same as content of the rear portion of the cyclically extended L-SIG field 2608, although the rear portion of cyclically extended L-SIG field 2608 is a cyclically shifted version of the rear portion of the L-SIG field 2605. Also, content of the rear portion of the L-SIG field 2605 is the same as content of the front portion of the cyclically extended L-SIG field 2608.

Figure 28:
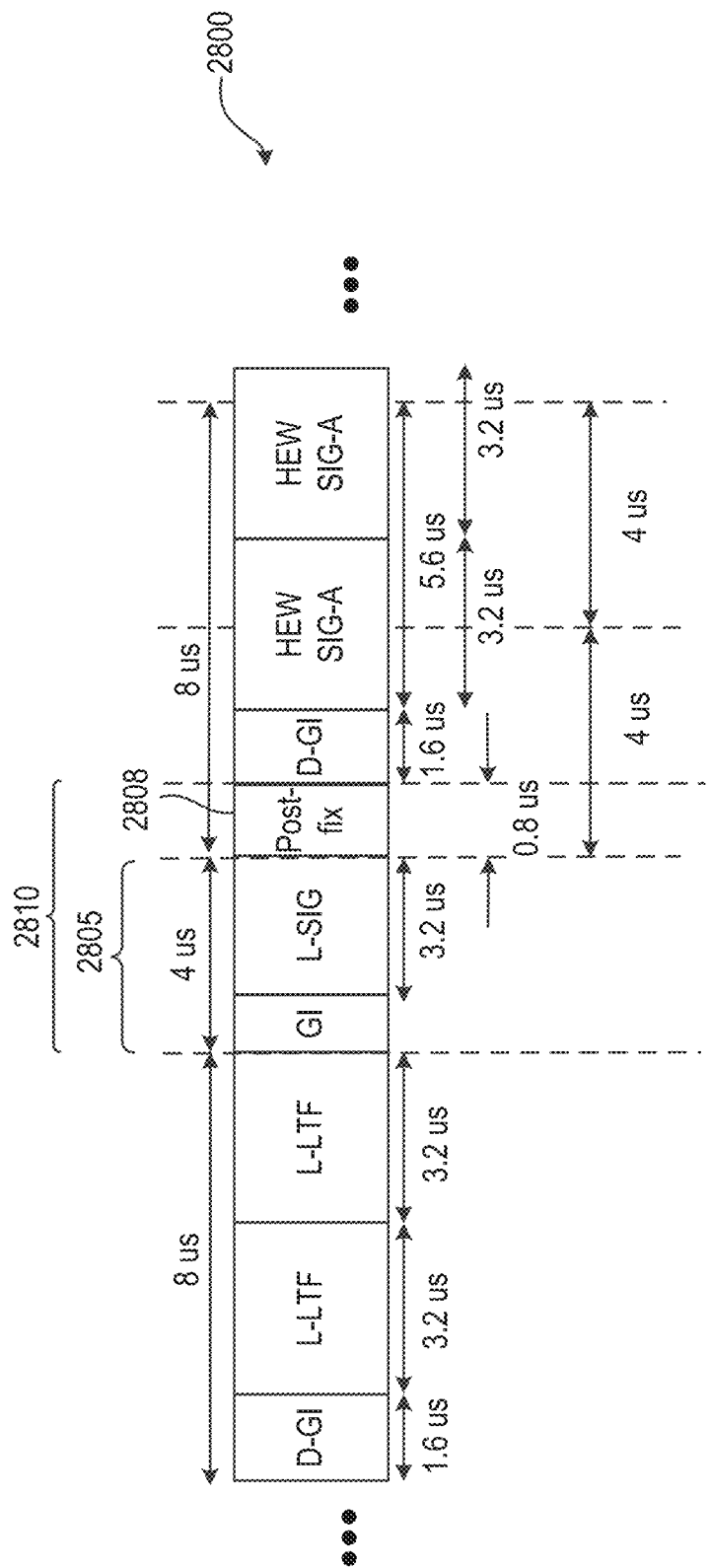
FIG. 28 illustrates an example of a portion of a PPDU format.

FIG. 28 illustrates an example of a portion of a PPDU format 2800. The PPDU format 2800 includes an extended L-SIG block 2810. The extended L-SIG block 2810 includes an L-SIG field 2805 (including GI) and a postfix 2808. The postfix 2808 may be referred to as a cyclic postfix of the L-SIG shown in the field 2805. The postfix 2808 may have a duration of 0.8 µs.

The PPDU format 2800 includes the L-SIG that is cyclically extended by a short duration (e.g., extended by 0.8 µs using the postfix 2808). The postfix 2808 may be utilized to facilitate coping with a largest channel delay spread that the receivers may need to handle. After the cyclically extended L-SIG block 2810, two SIG-A OFDM symbols without a GI between is sent. The two SIG-A OFDM symbols may be identical. A first SIG-A OFDM symbol of the two SIG-A OFDM symbols may utilize an EGI (shown as D-GI) to cope with large channel delay spread. In an aspect, detection of the EGI PPDU format, such as the PPDU format 2800, may be done using I Q imbalanced power loading.

Figure 29:
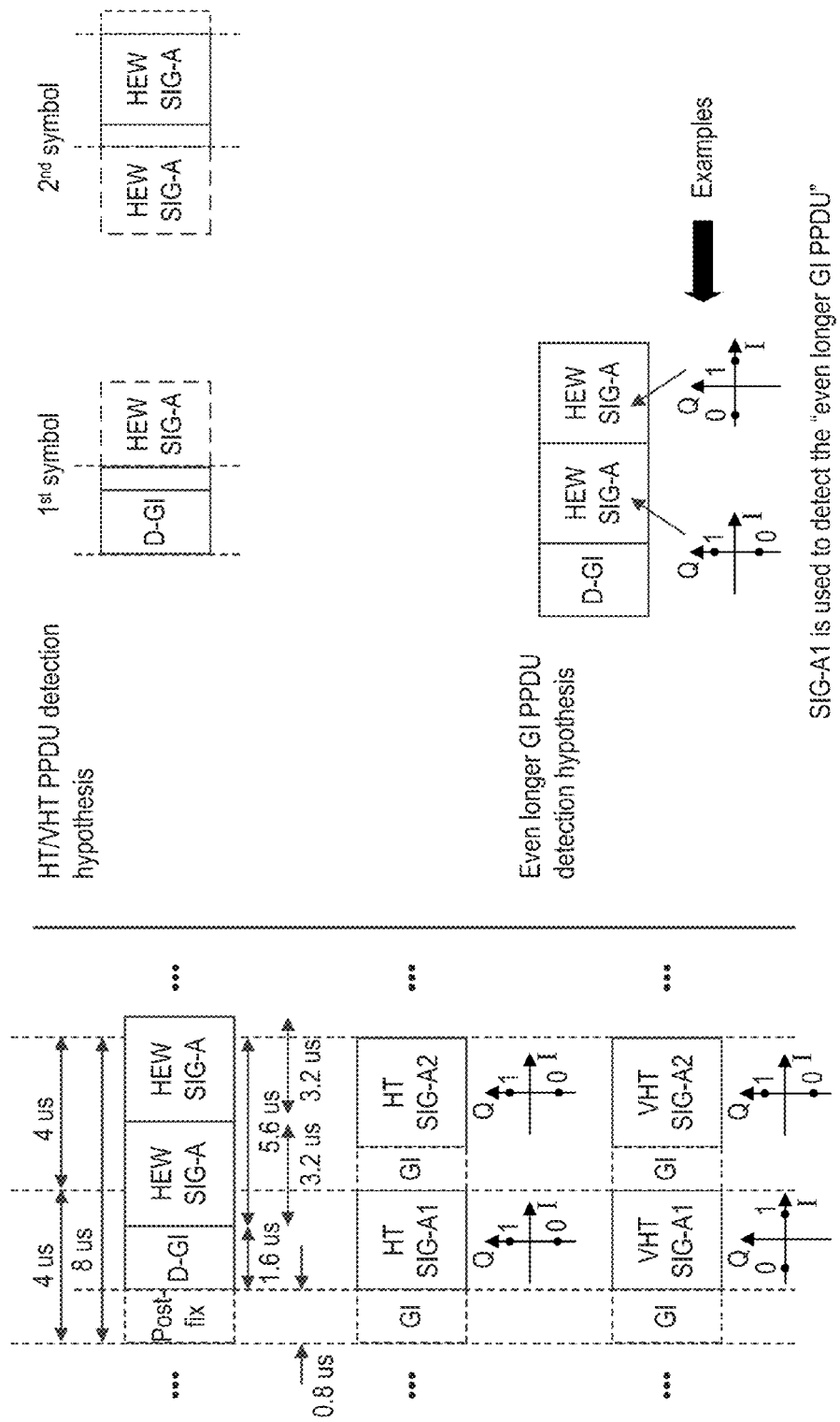
FIG. 29 illustrates a PPDU detection method that may be performed by HT or VHT devices receiving the PPDU format of FIG. 28.

FIG. 29 illustrates a PPDU detection method that may be performed by HT or VHT devices receiving a PPDU format 2800. Because the cyclic extension of L-SIG is relatively short, existing HT and VHT devices may attempt to detect the PPDU format 2800 (from among non-HT, HT, and VHT PPDU formats) from the SIG-A portion of the PPDU format 2900. Because HT and VHT devices are taking a cyclically shifted version of the OFDM symbol, the frequency domain modulated symbols will be phase rotated and the PPDU format 2800 may be spoofed as legacy PPDU format. In an aspect, for a first symbol, in the time-domain, a cyclically shifted version of SIG-A may be used for detection. For example, a portion of the OFDM symbol duration for SIG-A may be used for detection. The portion may contain ISI from the L-SIG field. In an aspect, a combination of SIG-A1 and SIG-A2 symbols may be used for detection. In some cases, this may have significant ISI.

Figure 30:
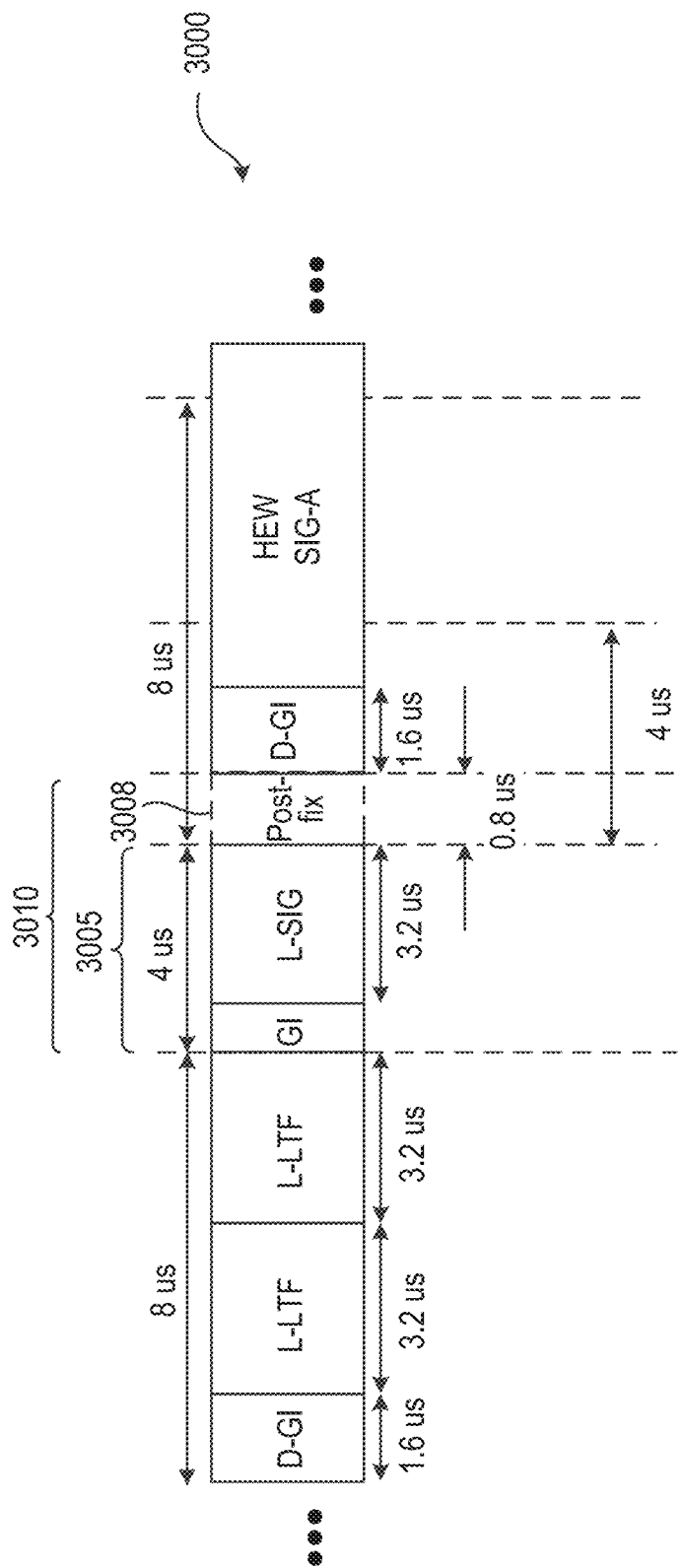
FIG. 30 illustrates an example of a portion of a PPDU format.

FIG. 30 illustrates an example of a portion of a PPDU format 3000. The PPDU format 3000 includes an extended L-SIG block 3010. The extended L-SIG block 3010 includes an L-SIG field 3005 and a postfix 3008. The postfix 3008 may have a duration of 0.8 µs.

The PPDU format 3000 includes the L-SIG that is cyclically extended by a short duration (e.g., 0.8 µs by the postfix 3008). The postfix 3008 may be utilized to facilitate coping with a largest channel delay spread that the receivers may need to handle. The SIG-A OFDM symbol with EGI is sent after the cyclically extended L-SIG block 3010. The SIG-A OFDM symbol may utilize multiple of 3.2 µs OFDM symbol duration. For example, the SIG-A OFDM symbol may utilize a 6.4 µs OFDM symbol duration, which can be implemented using a length 128 FFT/IFFT in 20 MHz bandwidth.

Figure 31:
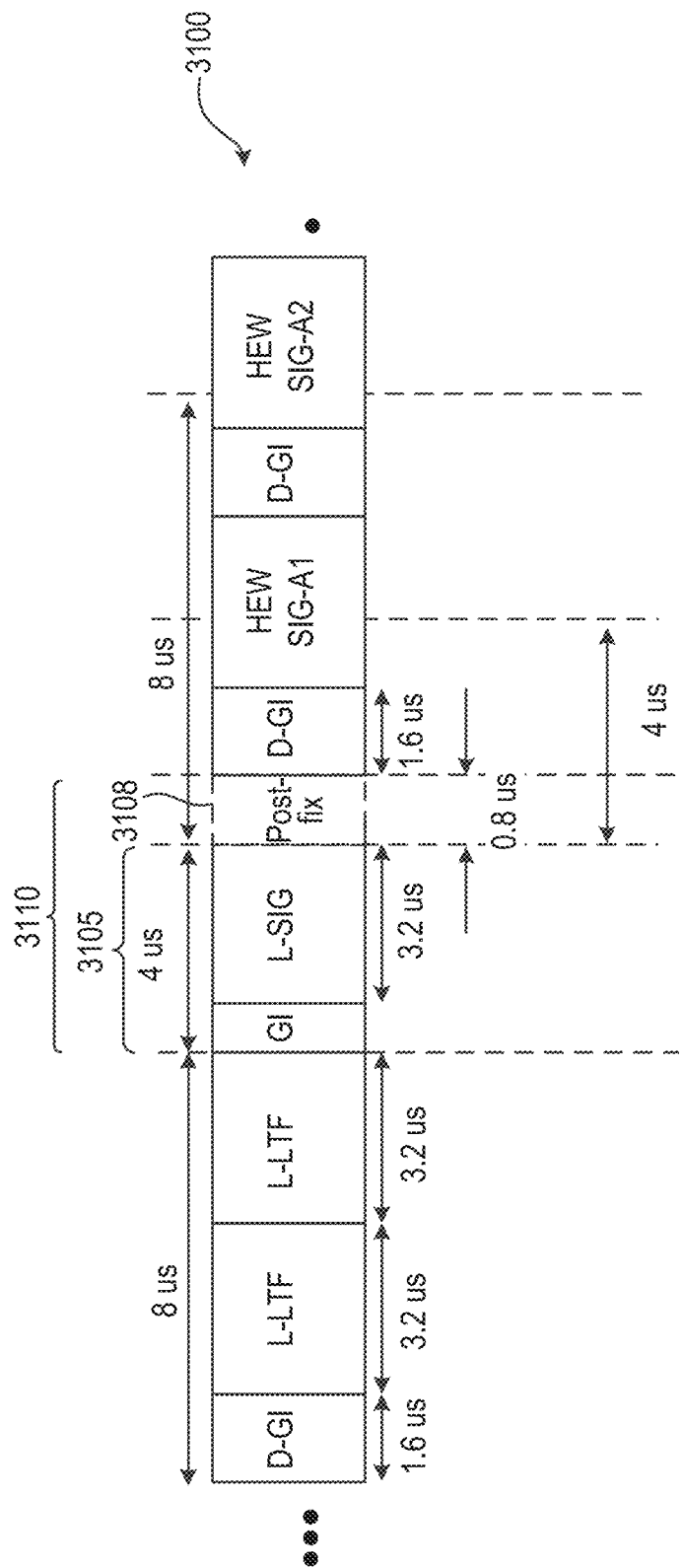
FIG. 31 illustrates an example of a portion of a PPDU format.
Figure 32:
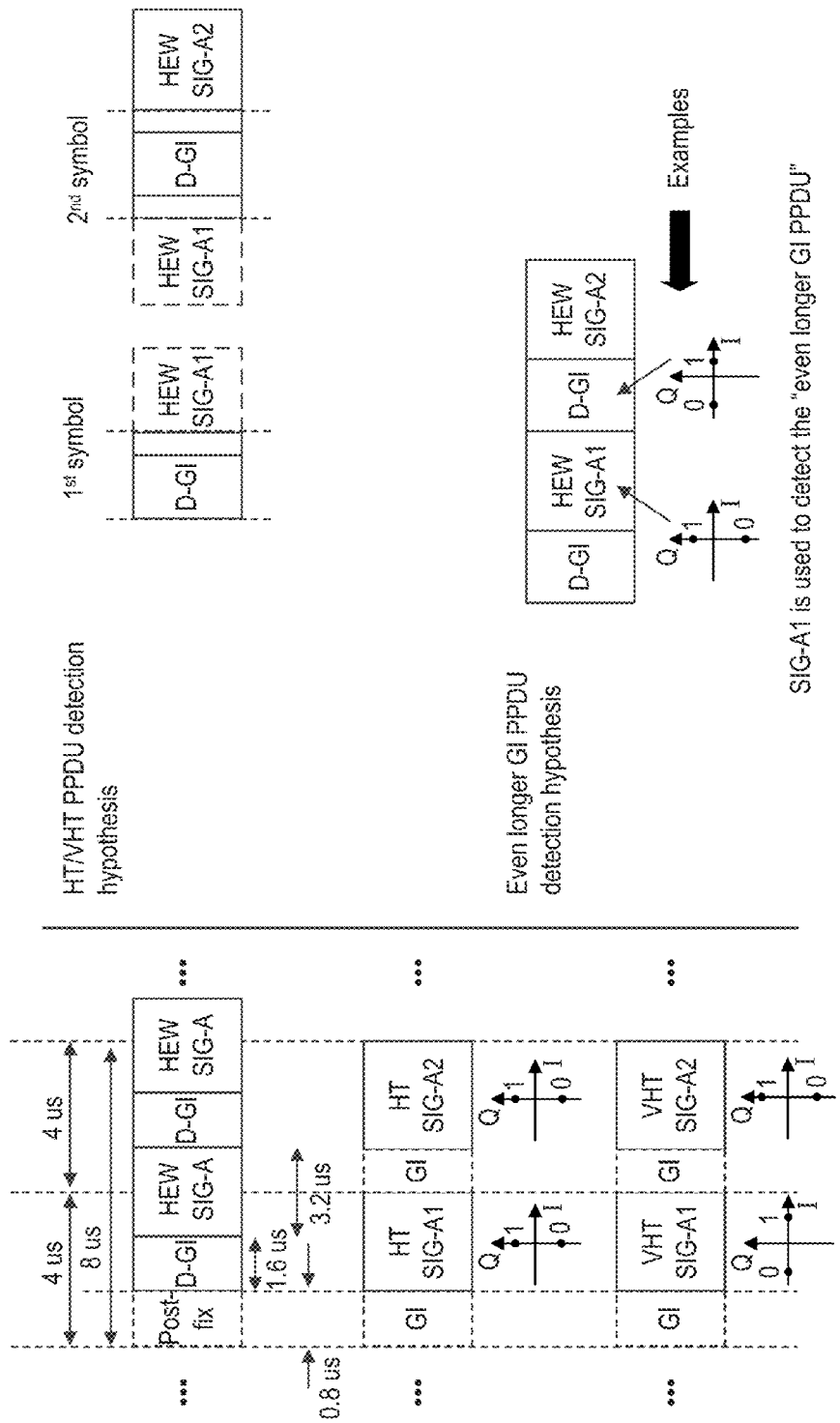
FIG. 32 illustrates a PPDU detection method that may be performed by HT or VHT devices receiving the PPDU format of FIG. 31.

FIG. 31 illustrates an example of a portion of a PPDU format 3100. The description from FIG. 30 generally applies to FIG. 31, with examples of differences between FIG. 30 and FIG. 31 and other descriptions provided herein for purposes of clarity and simplicity. The PPDU format 3100 includes a cyclically extended L-SIG block 3110. The cyclically extended L-SIG block 3110 includes the L-SIG field 3105 and a postfix 3108. In FIG. 31, the SIG-A OFDM symbol(s) each with EGI is sent after the cyclically extended L-SIG block 3110. Each SIG-A OFDM symbol may utilize a 3.2 µs OFDM symbol duration. FIG. 32 illustrates a PPDU detection method that may be performed HT or VHT devices receiving a PPDU format 3100. In an aspect, for a first symbol, in the time-domain, a cyclically shifted version of SIG-A may be used for detection. For example, a portion of the OFDM symbol duration for SIG-A may be used for detection. The portion may contain ISI from the L-SIG field. In an aspect, for a second symbol, a combination of SIG-A1 and SIG-A2 symbols may be used for detection. In some cases, this may have significant IS.

In one or more aspects, the horizontal dimension in each of FIGS. 4, 6, 7, 8, 12, 13, 17, 21, 24, 26, 28, 30, and 31 represents the time dimension or number of OFDM symbols.

In one or more aspects, each of FIGS. 7, 8, 13, 17, 21, 24, 26, 28, 30, and 31 illustrates a portion of a preamble of an HE frame (e.g., HE frame 700, 800, 1300, 1700, 2100, 2400, 2600, 2800, 3000, or 3100, respectively). The portions of the HE frame (e.g., HE frame 700, 800, 1300, 1700, 2100, 2400, 2600, 2800, 3000, or 3100, respectively) that are not shown in the respective figure (e.g., FIG. 7, 8, 13, 17, 21, 24, 26, 28, 30, or 31, respectively) are indicated with ellipses. In one or more aspects, the omitted portions may include one or more of the fields shown in FIG. 4 but not shown in respective FIG. 7, 8, 13, 17, 21, 24, 26, 28, 30, or 31 (e.g., L-STF, HE-SIG-B, HE-STF, HE-LTF, and/or HE-DATA).

In one or more aspects, an HE frame (e.g., 700, 800, 1300, 1700, 2100, 2400, 2600, 2800, 3000, or 3100, respectively) may have a format similar to the HE frame 400, except for the examples of differences described or shown. In one aspect, the L-SIG and RL-SIG fields together as shown in FIG. 4 may represent a block 810, 2410, 2610, 2810, 3010, or 3110. In one or more aspects, the term cyclic extension and cyclic shift may be used interchangeably.

In one or more aspects, the descriptions provided above with respect to FIGS. 24 and 25 may generally apply to FIGS. 26 through 31, except for the examples of differences described or shown with reference to FIGS. 26 through 31. In one aspect, the block 2410 may generally correspond to each of the blocks 2610, 2810, 3010, and 3110, except for the examples of differences as described or shown.

Referring to the various figures in this disclosure, in one aspect, the GI and EGI (or D-GI) each may be referred to as a cyclic prefix of the symbol(s) immediately following the respective GI or EGI (or D-GI). In one aspect, a postfix may be referred to as a cyclic postfix of the symbol immediately preceding the postfix. For example, referring to FIG. 26, for the block 2610, the GI in the field 2605 may be referred to as a cyclic prefix of L-SIG, and the postfix in the field 2608 may be referred to as a cyclic postfix of L-SIG in the field 2605. For the block 2611, the GI may be referred to as a cyclic prefix of the first L-SIG (e.g., a cyclic prefix of the L-SIG immediately following the GI), and the postfix may be referred to as a cyclic postfix of the second L-SIG (e.g., a cyclic postfix of the L-SIG immediately preceding the postfix). For the block 2612, the EGI (or D-GI) may be referred to as a cyclic prefix of the two cyclically shifted L-SIGs.

Like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 33A:
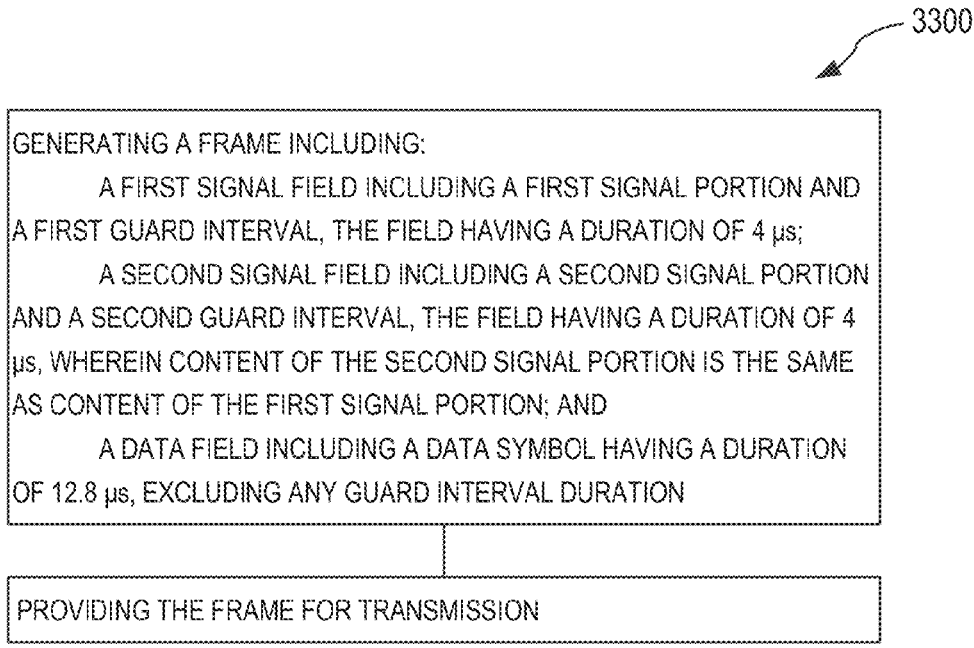
FIGS. 33A and 33B illustrate flow charts of examples of methods for facilitating wireless communication.
Figure 33B:
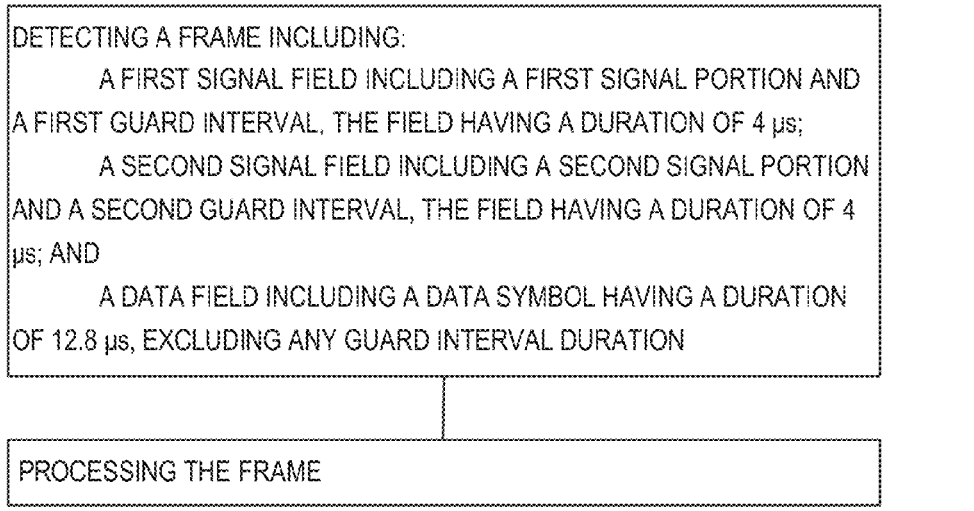

FIGS. 33A and 33B illustrate flow charts of examples of methods for facilitating wireless communication. For explanatory and illustration purposes, the example processes 3300 and 3320 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 3300 and 3320 are not limited to the wireless communication devices 111-115 of FIG. 1 or their components, and the example processes 3300 and 3200 may be performed by some of the devices shown in FIG. 1, or other devices or components. Further for explanatory and illustration purposes, the blocks of the example processes 3300 and 3320 are described herein as occurring in serial or linearly. However, multiple blocks of the example processes 3300 and 3320 may occur in parallel. In addition, the blocks of the example processes 3300 and 3320 need not be performed in the order shown and/or one or more of the blocks/actions of the example processes 3300 and 3320 need not be performed.

Various examples of aspects of the disclosure are described below as clauses for convenience. These are provided as examples, and do not limit the subject technology. As an example, some of the clauses described below are illustrated in FIGS. 33A and 33B.

Clause A. An apparatus for facilitating wireless communication, the apparatus comprising: one or more memories; and one or more processors coupled to the one or more memories, the one or more processors configured to cause: generating a frame, the frame comprising: a first signal field including a first signal portion and a first guard interval, the first signal field having a duration of 4 µs; a second signal field including a second signal portion and a second guard interval, the second signal field having a duration of 4 µs, wherein content of the second signal portion is the same as content of the first signal portion; and a data field including at least one data symbol, the at least one data symbol having a symbol duration of 12.8 µs, the symbol duration excluding any guard interval duration; and providing the frame for transmission.

Clause B. A non-transitory computer-readable storage medium storing computer-executable instructions that, when executed by one or more processors, cause one or more processors to perform operations, the operations comprising: detecting a frame, the frame comprising: a first signal field including a first signal portion and a first guard interval, the first signal field having a duration of 4 µs; a second signal field including a second signal portion and a second guard interval, the second signal field having a duration of 4 µs; and a data field including at least one data symbol, the at least one data symbol having a symbol duration of 12.8 µs, the symbol duration excluding any guard interval duration; and processing the frame.

Clause C. A computer-implemented method of facilitating wireless communication, the method comprising: detecting a frame, the frame comprising: a first signal field including a first signal portion and a first guard interval, the first signal field having a duration of 4 µs; a second signal field including a second signal portion and a second guard interval, the second signal field having a duration of 4 µs; and a data field including at least one data symbol, the at least one data symbol having a symbol duration of 12.8 µs, the symbol duration excluding any guard interval duration; and processing the frame.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for facilitating wireless communication, the apparatus comprising:
one or more memories; and
one or more processors coupled to the one or more memories, the one or more processors configured to cause:
generating a frame, the frame comprising:
a first signal field including a first signal portion and a first guard interval, the first signal field having a duration of 4 μs, the first signal portion having a duration of 3.2 μs, the first guard interval having a duration of 0.8 μs;
a second signal field including a second signal portion and a second guard interval, the second signal field having a duration of 4 μs, the second signal field having a duration of 3.2 μs, the second guard interval having a duration of 0.8 μs; and
a data field including one or more data symbols, each of the one or more data symbols having a symbol duration of 12.8 μs, the symbol duration excluding any guard interval duration; and
providing the frame for transmission,
wherein the first signal portion immediately follows the first guard interval, the second signal portion immediately follows the first signal portion, and the second guard interval immediately follows the second signal portion,
wherein the first guard interval is the same as 0.8 μs of the rear portion of the first signal portion in time domain,
wherein the second signal portion is the same as the first signal portion in time domain,
wherein the second guard interval is the same as 0.8 μs of the foremost portion of the second signal portion in time domain.

2. The apparatus of claim 1, wherein the frame further comprises a Legacy Short Training Field (L-STF), and a Legacy Long Training Field (L-LTF) immediately following the L-STF, the L-LTF immediately preceding the first signal field.

3. The apparatus of claim 2, wherein the Legacy Short Training Field (L-STF) has a duration of 8 μs, and a Legacy Long Training Field (L-LTF) has a duration of 8 μs.

4. The apparatus of claim 1, wherein the frame further comprises a high-efficiency Signal A field (HE-SIG-A field).

5. The apparatus of claim 4, wherein the HE-SIG-A field immediately follows the second signal field.

6. A computer-implemented method of facilitating wireless communication, the method comprising:
detecting a frame, the frame comprising:
a first signal field including a first signal portion and a first guard interval, the first signal field having a duration of 4 µs, the first signal portion having a duration of 3.2 µs, the first guard interval having a duration of 0.8 µs;
a second signal field including a second signal portion and a second guard interval, the second signal field having a duration of 4 µs, the second signal field having a duration of 3.2 µs, the second guard interval having a duration of 0.8 µs; and
a data field including at least one data symbol, the at least one data symbol having a symbol duration of 12.8 µs, the symbol duration excluding any guard interval duration; and
processing the frame,
wherein the first signal portion immediately follows the first guard interval, the second signal portion immediately follows the first signal portion, and the second guard interval immediately follows the second signal portion,
wherein the first guard interval is the same as 0.8 µs of the rear portion of the first signal portion in time domain,
wherein the second signal portion is the same as the first signal portion in time domain,
wherein the second guard interval is the same as 0.8 µs of the foremost portion of the second signal portion in time domain.

7. The method of claim 6, wherein the processing comprises determining that the frame includes one or more of a cyclically shifted version of the first signal field and a cyclically shifted version of the second signal field.

8. The method of claim 6, wherein the second guard interval is a postfix.

9. The method of claim 6, wherein a version of the frame is a high efficiency version.

10. The method of claim 6, wherein the frame further comprises a Legacy Short Training Field (L-STF), and a Legacy Long Training Field (L-LTF) immediately following the L-STF, the L-LTF immediately preceding the first signal field.

11. The method of claim 10, wherein the Legacy Short Training Field (L-STF) has a duration of 8 µs, and a Legacy Long Training Field (L-LTF) has a duration of 8 µs.

12. The method of claim 6, wherein the frame further comprises a high-efficiency Signal A field (HE-SIG-A field).

13. The method of claim 12, wherein the HE-SIG-A field immediately follows the second signal field.

* * * * *